United States Patent
Goldwater et al.

(10) Patent No.: US 8,553,260 B2
(45) Date of Patent: Oct. 8, 2013

(54) PREVIEW AND MODIFICATION OF PRINTABLE COMPONENTS OF A DOCUMENT AT A PRINTING DEVICE

(75) Inventors: Mark Goldwater, Lexington, MA (US); Shenbo Yu, Andover, MA (US); Luis Garcia, Cumberland, RI (US); Gang Dong, Westford, MA (US); Michael Braun, Markgroeningen (DE)

(73) Assignee: CSR Imaging US, LP, Burlington, MA (US)

( * ) Notice: Subject to any disclaimer, the term of this patent is extended or adjusted under 35 U.S.C. 154(b) by 571 days.

(21) Appl. No.: 12/791,844

(22) Filed: Jun. 1, 2010

(65) Prior Publication Data

US 2011/0075200 A1   Mar. 31, 2011

Related U.S. Application Data

(60) Provisional application No. 61/246,406, filed on Sep. 28, 2009.

(51) Int. Cl.
  *G06F 3/12* (2006.01)
  *G06F 17/00* (2006.01)
  *H04N 1/387* (2006.01)

(52) U.S. Cl.
  USPC .......... 358/1.15; 358/1.18; 358/1.9; 358/527; 358/537; 358/452; 715/255; 715/274

(58) Field of Classification Search
  None
  See application file for complete search history.

(56) References Cited

U.S. PATENT DOCUMENTS

| | | | |
|---|---|---|---|
| 6,616,359 B1 | 9/2003 | Nakagiri et al. | |
| 6,851,875 B2 | 2/2005 | Shiragami | |
| 7,239,412 B2 | 7/2007 | Leslie | |
| 2002/0080405 A1* | 6/2002 | Kuroda | 358/1.18 |
| 2003/0020939 A1* | 1/2003 | Sugahara | 358/1.13 |
| 2003/0067630 A1 | 4/2003 | Stringham | |

(Continued)

FOREIGN PATENT DOCUMENTS

| | | |
|---|---|---|
| EP | 1215877 A2 | 6/2002 |
| JP | 2007050664 A | 3/2007 |

(Continued)

OTHER PUBLICATIONS

International Search Report for International Patent Application No. PCT/US2010/050439 mailed Jun. 23, 2011.

(Continued)

*Primary Examiner* — Satwant Singh
(74) *Attorney, Agent, or Firm* — Frommer Lawrence & Haug LLP; John W. Branch

(57) ABSTRACT

An apparatus, method, system and medium are described that support functionality to receive document(s) to be printed at a printing device, and enable editing the document(s) prior to printing. Modifications to the document(s) may be generated based on the user edits, and a print preview of the modified documents may be displayed and may enable further edits. In some embodiments, the print preview may be provided to the user on a display that is part of the printing device. In some embodiments, the print preview may be provided to the user through a UI presented on a client device. Display of the modified document(s) may be a rasterized image of the modified document(s), generated based on capabilities of a selected printing device. In some embodiments, modifications may be made to an intermediate version of the document(s), and that intermediate version may be cached.

20 Claims, 14 Drawing Sheets

(56) References Cited

U.S. PATENT DOCUMENTS

| | | |
|---|---|---|
| 2005/0213156 A1 | 9/2005 | Kang et al. |
| 2006/0066899 A1* | 3/2006 | Yoshida ................ 358/1.15 |
| 2006/0215197 A1 | 9/2006 | Tobioka |
| 2006/0217826 A1* | 9/2006 | Matsuya ................. 700/90 |
| 2007/0171436 A1* | 7/2007 | Manchester .............. 358/1.1 |
| 2009/0059305 A1 | 3/2009 | Ricard |
| 2010/0328716 A1* | 12/2010 | Mori ..................... 358/1.15 |

FOREIGN PATENT DOCUMENTS

| | | |
|---|---|---|
| KR | 10-2006-0022823 A | 3/2006 |
| KR | 10-0574514 B1 | 4/2006 |
| KR | 10-2006-0099616 A | 9/2006 |
| KR | 10-2007-0014467 A | 2/2007 |

OTHER PUBLICATIONS

International Search Report for International Patent Application No. PCT/US2010/050447 mailed May 25, 2011.

European Search Report for European Patent Application No. 10819623 issued Jul. 26, 2012.

Official Communication in U.S. Appl. No. 12/791,840, mailed Apr. 1, 2013.

Official Communication in U.S. Appl. No. 12/791,840, mailed May 20, 2013.

European Search Report for European Application No. 10819627 issued Jul. 26, 2012.

International Preliminary Report on Patentability for International Patent Application No. PCT/US2010/050439 mailed Apr. 12, 2012.

International Preliminary Report on Patentability for International Patent Application No. PCT/US2010/050447 mailed Apr. 12, 2012.

\* cited by examiner

PREVIEW AND MODIFICATION OF PRINTABLE COMPONENTS OF A DOCUMENT AT A PRINTING DEVICE

CROSS-REFERENCE TO RELATED APPLICATIONS

The present application claims priority to U.S. Provisional Application Ser. No. 61/246,406 entitled "Method and System for Previewing and Modifying Print Jobs," filed on Sep. 28, 2009, the benefit of the earlier filing date of which is hereby claimed under 35 U.S.C. §119(e) and 37 C.F.R. §1.78, and which is incorporated herein by reference in its entirety.

TECHNICAL FIELD

The present invention relates generally to image data processing for printers and, more particularly, but not exclusively to displaying documents to be printed, enabling modification of the documents by a user, and generating and previewing raster image of the modified documents based on capabilities of the printer.

BACKGROUND

With the advent of ubiquitous computing, graphical user interfaces, and multimedia data exchange in business, arts, and personal use, efficient and high-quality processing and printing of documents have become increasingly important. Network-connected printers and/or multi-function printing devices (MFPs) may receive documents to be printed from various sources such as job queues, security queues, document management systems, built-in disk storage, digital cameras, removable mass storage devices, network computing devices and/or mobile computing devices. And in general, the documents may be displayed on a device such as a computer display prior to being sent to a printing device as part of a print job. However, such a display may fail to accurately depict the printed result, due to variations in printer capabilities. Further, a user may lack the capability and/or the opportunity to select, examine, and modify the documents, and review the results of such modifications, prior to printing the documents.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
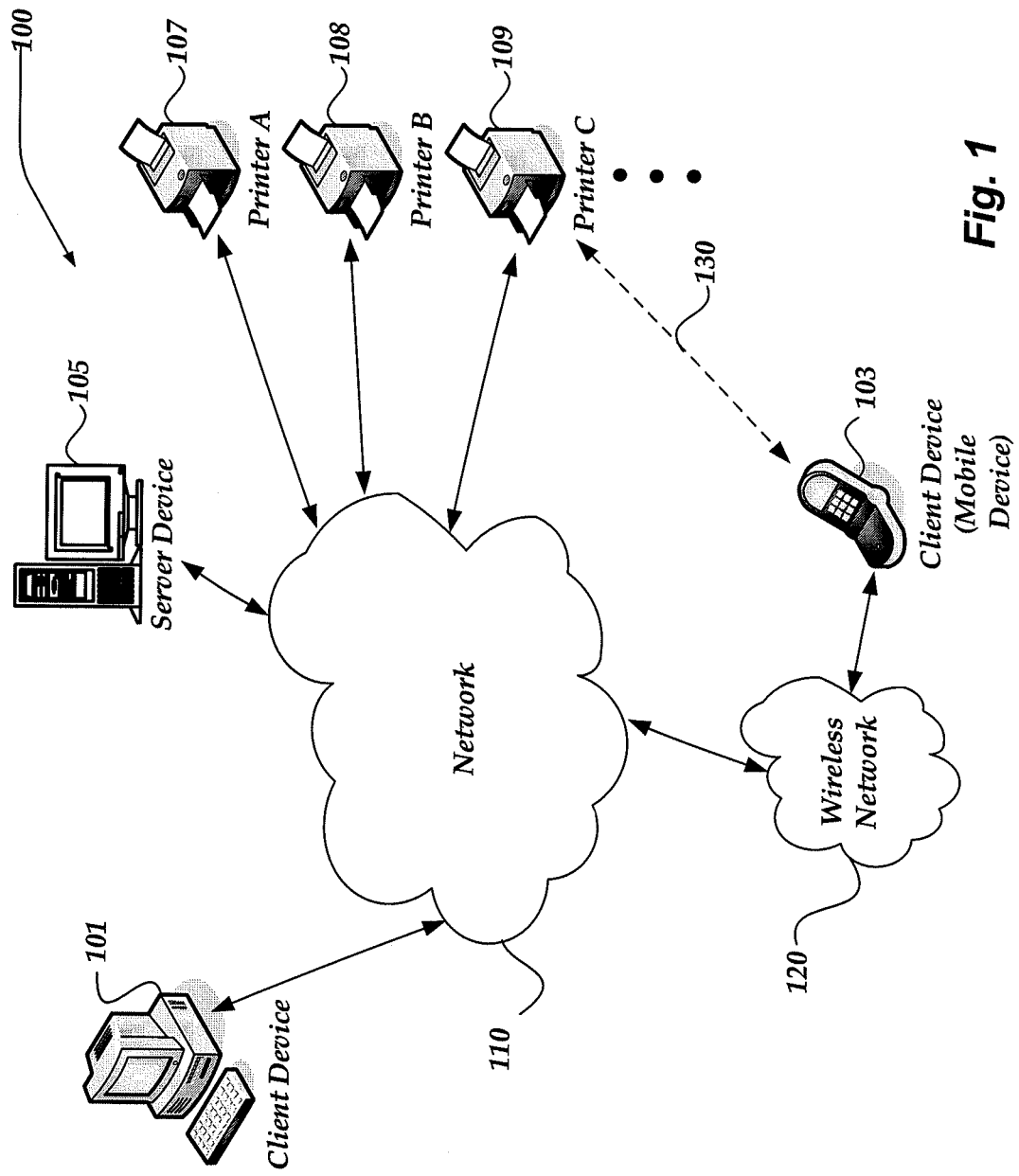
FIG. 1 is a system diagram of an exemplary environment in which embodiments of the invention may be implemented.

The present invention now will be described more fully with reference to the accompanying drawings, which form a part hereof, and which show, by way of illustration, specific embodiments by which the invention may be practiced. This invention may, however, be embodied in many different forms and should not be construed as limited to the embodiments set forth herein. Rather, these embodiments are provided so that this disclosure will be thorough and complete, and will fully convey the scope of the invention to those skilled in the art. Among other things, the present invention may be embodied as methods, devices, systems, and processor readable storage media. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "document" may refer to a digital representation of a body of information assembled with the capacity to communicate. A document may include symbolic, diagrammatic, and/or sensory-representational information, including but not limited to text, graphics, images, metadata, and the like. In some embodiments, a document may be considered a digital artifact, and may be associated with a print job that a user has requested to be printed at the printer. A document may include virtually any type of document that may be printed by a printing device. For example, documents may include text documents created by a text editor (e.g. Microsoft Word, Corel WordPerfect, TeX, OpenOffice, and the like), graphics documents created by a graphics painting program (e.g. Microsoft Paint, MacPaint, or other bitmap and/or vector-based graphics design software), image documents created by photographic systems, optical scanners, and the like, or documents that include any combination of text, graphics, images, and/or other visual representations of information.

As used herein, the term "intermediate document" may refer to a form of document that has been interpreted, translated, or otherwise generated based on a document received at the printer. In some embodiments, documents may be received as an input data stream, with data in a PDL such as HP PCL, Postscript, PDF, XPS, XL, or the like, and an interpretation process may interpret the received data stream into one or more intermediate documents. In some embodiments, an intermediate document may be a collection of objects (e.g. graphic objects) that are bound to the printing device, i.e. described in a manner that is associated with the printing device's capabilities, supported formats, and the like.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, some embodiments support functionality to receive one or more documents to be printed at a printing device, and enable a user to edit the document(s) at the printing device or through a user interface presented to the user at a client device. Embodiments of the claimed invention may then generate modifications to the document(s) based on the edits specified by the user, and provide to the user a print preview of the modified documents. In some embodiments, the print preview may be provided to the user through a UI presented on a display (e.g. an LCD display) that is part of the printing device. However, the claimed invention is not so limited, and in some embodiments, the print preview may be provided to the user through a UI presented on a client device (e.g. a user's mobile device, desktop computer, and the like). Edits specified to the document(s) by the user through the print preview UI may be incorporated into the document(s) as one or more modifications, and the modified document(s) may then be displayed to the user who may select to print the modified document(s) and/or make further edits.

User edits may include edits that add or modify content of the documents, such as letterhead, page numbering, watermarks, header/footer, additional text, graphics, images, and the like. User edits may also include edits that alter the format and/or layout of the documents, such as modifications related to N-Up, page scaling, pagination, color palette, zoom, pan, cropping, and the like. In some embodiments, the received document(s) may be interpreted into an intermediate form, and modifications made to the document(s) based on the user edits may be made to the intermediate form of the documents.

Display of the document(s) (either before or after modification) may be following a rasterization, such that the display document(s) are raster images of the document made based on capabilities of the printing device on which the document(s) are to be printed. In this way, the user may be presented with an image of the modified document(s) that is an accurate depiction of the document(s) as they would be printed on the printing device.

As described further herein, embodiments of the claimed invention may enable a network connected printer, multi-function printing device, and/or other printing device to receive jobs from one or more sources (e.g., job queues, security queues, document management systems, built-in disks, external disks, digital cameras, mobile devices, removable mass storage devices, and the like), and enable a user to select, examine and/or manipulate one or more documents from such print jobs prior to printing.

Generally, multi-function printing devices may include a display (e.g. a LCD) used for listing various functions related to printing. Embodiments of the invention may take advantage and expand the capability and/or usability of such displays to enable a user to make various edits to documents prior to printing. Such edits may be important for legal requirements and/or privacy concerns, for example edits such as sequential page number (e.g. Bates numbering) confidentiality or other watermarks, headers/footers, and the like. Embodiments of the invention may also enable features that may be advantageous to a user, such as walk-up printing to enable a user to walk up to the printer, edit and print one or more documents stored on a portable storage device (e.g. thumb drive) and/or mobile device (e.g. smart phone, camera, etc.). Documents to be printed may also be retrieved from a local disk, from a web site or other network location, and/or remote repository such as a corporate document management system (e.g. Microsoft SharePoint, Adobe LifeCycle, etc.), and the like. Some embodiments of the invention support various degrees of integration between document management systems and software applications that implement inventive features (e.g. the print preview UI and/or print processing application described further herein).

Illustrative Operating Environment

FIG. 1 shows an exemplary system in which one or more embodiments may be implemented and/or practiced. Not all the components may be required to practice the invention, and variations in the arrangement and type of the components may be made without departing from the spirit or scope of the invention. As shown, system 100 of FIG. 1 includes network 110, wireless network 120, client device 101, mobile client device 103, server device 105, and printers 107-109.

An embodiment of client device 101 is described in more detail below with regard to the network device depicted in FIG. 4. Briefly, however, client device 101 may include computing devices that are typically stationary, such as personal computers, workstations, network terminals, multiprocessor systems, multiprocessor-based or programmable consumer electronics, entertainment consoles, gaming consoles, and the like. In some embodiments, client device 101 may connect to network 110 over a wired network. In some embodiments, client device 101 may additionally or alternatively connect to network 110 over a wireless network such as wireless network 120.

Figure 4:
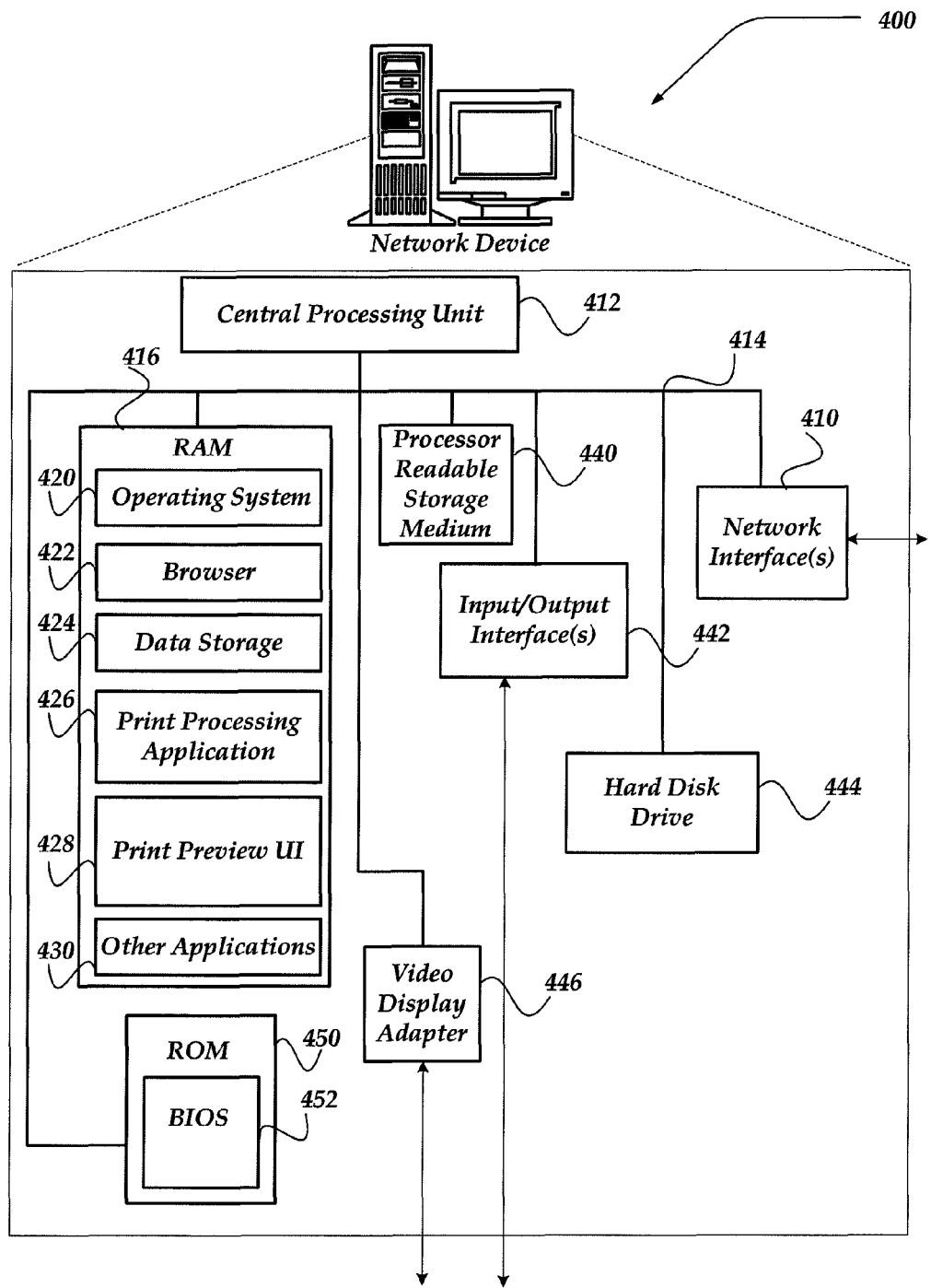
FIG. 4 shows an embodiment of a network device that may be included in a system such as that shown in FIG. 1.

An embodiment of server device 105 is described in more detail with respect to the network device depicted in FIG. 4. Briefly, however, server device 105 may include computing devices that are typically stationary, such as personal computers, workstations, network terminals, multiprocessor systems, and the like. In some embodiments, server device 105 may connect to network 110 over a wired network. In some embodiments, server device 105 may additionally or alternatively connect to network 110 over a wireless network such as wireless network 120. In some embodiments, server device 105 may be configured to perform updates to applications, software modules, etc. (e.g. firmware) of printers 107-109, client device 101, and/or mobile client device 103.

An embodiment of mobile client device 103 is described in more detail below with regard to FIG. 3. Briefly, however, mobile client devices 103 may include virtually any computing device capable of receiving and sending a message over a network. Such devices may include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. In some embodiments, mobile client device 103 may be configured to connect to network 110 over a wireless network such as wireless network 120. In some embodiments, mobile client device 103 may additionally or alternatively connect to network 110 over a wired network.

Client devices 101 and 103 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. In at least some embodiments, client devices 101 and 103 may be configured to provide data such as documents to at least one of printing devices 107-109 for printing.

In one embodiment, client devices 101 and 103 may provide the documents for printing using any of a variety of mechanisms. For example, client devices 101 and 103 may communicate via a page description language (PDL) or printer command language (PCL), such as HP PCL, Postscript, PDF, XPS, or the like. However, client devices 101 and 103 are not constrained to these communication mechanisms and others may also be used. For example, in some embodiments, client devices 101 and 103 may also communicate using a graphics API such graphical device interface (GDI) format, OpenGL format, or the like.

As illustrated, client devices 101 and 103 may communicate with printing devices 107-109 over network 110 and/or wireless network 120. However, the invention is not so limited. For example, in some embodiments, and as shown, a client device such as client device 103 may communicate directly to a printing device such as printer 109 via a direct communications method such as an IR signal, shown in FIG. 1 as dotted line 130. In some embodiments, one or more of printers 107-109 may be hosted or otherwise connected to a server such as server 105, such that communication between a client device and the printer takes place via the host server. In such cases, the hosting server may act as a printer hub or print server for one or more printing devices.

Network 110 may be configured to couple client devices 101 and 103 to each other, in some embodiments via wireless network 120. Further, network 110 may couple client devices 101 and 103 to server 105 and/or to printing devices 107-109. Network 110 is enabled to employ any form of computer readable media for communicating information from one electronic device to another. Network 110 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router, switch or other network device may act as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including, but not limited to satellite links, or other communications links known to those skilled in the art. Furthermore, remote computers and other related electronic devices could be remotely connected to either LANs or WANs via a modem and temporary telephone link.

Wireless network 120 may be configured to couple mobile client devices such as mobile device 103 and its components with network 110. Wireless network 120 may include any of a variety of wireless sub-networks that may further overlay stand-alone ad hoc networks, and the like, to provide an infrastructure-oriented connection for mobile client device 103. Such sub-networks may include mesh networks, Wireless LAN (WLAN) networks, cellular networks, and the like. Wireless network 120 may further include an autonomous system of terminals, gateways, routers, and the like connected by wireless radio links, and the like. These connectors may be configured to move freely and randomly and organize themselves arbitrarily, such that the topology of wireless network 120 may change rapidly.

Wireless network 120 may employ one or more access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 101 and 103, server device 105, and/or printing devices 107-109 with various degrees of mobility. For example, wireless network 120 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 120 may include virtually any wireless communication mechanism by which information may travel between client devices 101 and 103, server device 105, and/or printing devices 107-109, and other computing devices and/or networks, or the like.

Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

An embodiment of printers 107-109 is described in more detail below with regard to FIG. 2. Briefly, printing devices 107-109 may represent virtually any apparatus that is configured to print data onto a hardcopy format, such as paper. In one embodiment, printing devices 107-109 represent laser printing devices that are configured to employ a laser beam or similar technology to transfer print data onto a hardcopy format. It should be noted that while laser printing is described as one embodiment, the invention is not so limited, and other printing mechanism may also be employed without departing from the scope of the invention.

In some embodiments, printing devices 107-109 are configured and arranged to print data at different resolutions. Moreover, printing devices 107-109 may be configured to provide output in black and white, and/or in color. Printing devices 107-109 may further be configured to print images, graphics and/or text. In one embodiment, printing devices 107-109 are configured to employ laser printing mechanisms.

Illustrative Printer Device

Figure 2:
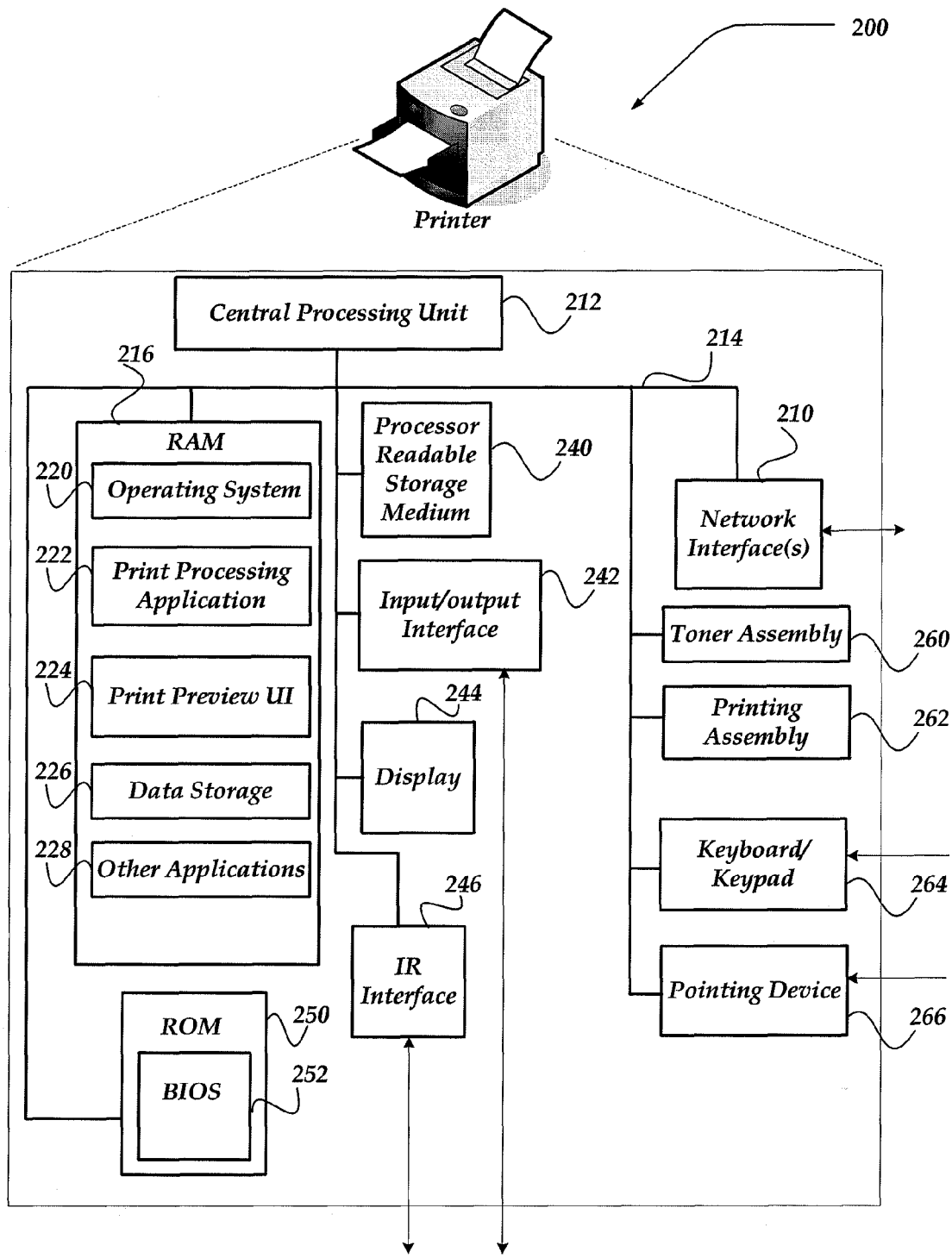
FIG. 2 shows an embodiment of a printing device that may be included in a system such as that shown in FIG. 1.

FIG. 2 shows one embodiment of printer 200 that may be included in a system implementing the invention. Printer 200 may include many more or less components than those shown in FIG. 2. However, the components shown are sufficient to disclose an illustrative embodiment for practicing the present invention. Printer 200 may represent, for example, one or more of printers 107-109 of FIG. 1. In some embodiments, printer 200 may be configured to employ laser print technology. However, the invention is not so constrained, and other print technologies may also be employed without departing from the scope of the invention, including but not limited to LED printers (or other toner-based printing technologies), liquid inkjet printers, solid ink printers, dye-sublimation printers, inkless printers such as thermal printers and UV printers, dot-matrix printers, line printers, pen-based plotters, and the like.

As shown, printer 200 may include central processing unit 212, one or more network interfaces 210, processor readable storage medium 240, input/output interface 242, display 244, infrared (IR) interface 246, toner assembly 260, printing assembly 262, keyboard and/or keypad 264, pointing device 266, and a mass memory, all in communication with each other via bus 214. The mass memory may generally include RAM 216, and ROM 250, and may also include a processor readable storage medium 240. As illustrated in FIG. 2, printer 200 may communicate with the Internet, or some other communications network, via network interface(s) 210, employing various communication protocols including but not limited to TCP/IP, Wi-Fi, Bluetooth, or the like. Communications may also be over a universal serial port (USB); a parallel port; a serial bus such as RS-232 (Recommended Standard 232), ANSI/TIA/EIA-422, or the like; IEEE 1394 (e.g., Firewire); or the like. Network interface unit(s) 210 is sometimes known as a transceiver, transceiving device, or network interface card (NIC).

IR interface 246 may enable communication between printer 200 and a client device such as mobile client device 103 depicted in FIG. 1. IR interface 246 may support communication via an IR communication protocol such as the Infrared Data Association (IrDA) protocol, or the like. In some embodiments, IR interface 246 may support communications with a client device that is with a short range of, and/or in line-of-sight with printer 200. Connection 130 depicted in FIG. 1 illustrates an example of such a direct communication between mobile client device 103 and one or more of printers 107-109.

Keyboard/keypad 264 may comprise any input device arranged to receive input from a user. For example, keyboard/keypad 264 may include a push button numeric dial, keyboard, touch screen, or the like. Keyboard/keypad 264 may include alphabetic inputs, numeric inputs, and/or other character inputs, and may further include function and/or command buttons associated with functionality for selecting, examining, editing, and/or printing documents. User inputs made via keyboard/keypad 264 may be shown in display 244.

Pointing device 266 may include virtually any device that enables a user to input spatial and/or positional data to printer 200. Pointing device 266 may include devices based on the user touching a surface, such as a touchpad, touchscreen, graphics tablet, joystick or pointing stick, either with a body part (e.g. finger or hand) or with an object such as a wand, stylus, pen, lightpen and the like. Pointing device 266 may further include devices based on the user moving an object, such as a mouse, trackball, joystick, and the like. User inputs made via pointing device 266 may be shown in display 244.

Display 244 may include virtually any type of display, monitor, terminal, screen and the like that displays text, graphics, images, and/or any other type of data to a user. Types of displays may include, but are not limited to, a liquid crystal display (LCD), gas plasma, light emitting diode (LED), cathode ray tube (CRT), or the like. Display 244 may also interface to keyboard/keypad 264 and/or pointing device 266 to receive and display user input. Additionally, or alternatively, printer 200 may communicate with one or more display devices that are external to the printer, to display information regarding print jobs and/or the documents to be examined and modified by a user.

Input/output interface 242 may include various means for communicating with external devices, such as external displays, user input devices, computer devices, networking devices, and the like. Input/output interface 242 may employ one or more communications technologies including but not limited to USB, Bluetooth, serial port (e.g. RS-232 standard), parallel port (e.g. IEEE 1284 standard), and the like.

The mass memory as described above illustrates an exemplary type of computer-readable media, namely computer-readable or processor-readable storage media. Such mass memory included in printer 200 may include RAM 216 and ROM 250, and/or processor readable storage medium 240. Computer-readable storage media, or processor-readable storage media, may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory such as RAM 216 may store operating system 220 for controlling the operation of printing device 200. Any general-purpose operating system (e.g. Windows, UNIX, LINUX, and the like) that supports the functionality of printer 200 may be employed. In some embodiments, operating system 220 may be a specially configured version of a general-purpose operating system, or may be a specialized operating system designed and created to support the functionality of printer 200. Operating system 200 may include or interface with a virtual machine module such as the Java virtual machine or Microsoft .NET runtime that may enable control of hardware components and/or operating system functions via applications that run under such virtual machine modules. Basic input/output system ("BIOS") 252 may also be provided for controlling the low-level operation of printer 200, such as startup, diagnostics, and the like. As shown in FIG. 2, BIOS may be stored in and/or executed from mass memory such as ROM 250.

The mass memory may also store program code, instructions, and/or data. For example data storage 226 may be configured to store printer commands, diagnostics, user preferences, printer control software, information regarding the capabilities of the printer such as supported color palettes, fonts, pagination, page size, and the like. Data storage 226 may further store documents to be printed, intermediate documents, information regarding user edits and/or modifications, raster images of documents to be printed, and the like, as well as any other information needed for selecting, examining, editing, modifying, displaying and/or printing the documents.

In some embodiments, mass memory may also store one or more applications, programs, software modules and the like for the operation of embodiments of the invention. Such applications may include print processing application 222 and print preview UI 224. The general operation of these applications is described further herein with regard to FIGS. 5-11. In some embodiments, one or both of print processing application 222 and print preview UI 224 may store, cache, and/or access data in data storage 226 and/or processor readable storage medium 240, and may display information at display 244. Mass memory such as RAM 216 may also include other applications 228 that may also be configured to store, cache and/or access data in data storage 226 and/or processor readable storage medium 240, and may display information at display 244. Applications 222, 224 and 228 may be loaded into mass memory and run on operating system 220. Although such applications are illustrated as included in RAM 216, the invention is not so limited. For example, one or more of applications 222, 224 and/or 228 may also be loaded into and/or run on ROM 250 and/or processor readable storage medium 240 without departing from the scope of the invention.

As stated herein, printer 200 may incorporate various types of printing technologies without departing from the scope of the invention. In some embodiments, printer 200 may be configured to employ laser printing technology. The following is an exemplary, non-limiting description of laser printing technology that may be employed to implement embodiments of the invention. In such embodiments, printing assembly 262 may include such elements as are necessary for laser printing, such as a drum assembly, corona wire, fuser, discharge lamp, laser scanning unit, and/or photoreceptor. In some embodiment, drum assembly may be configured to revolve, and may be made of any of a variety of photoconductive materials. The drum assembly may be given an electric charge by the corona wire (or in some embodiments by a charged roller). As the drum assembly rotates, a laser scanning unit may direct a laser beam across the drum assembly's surface based on the data to be printed. A toner assembly 260 may provide toner, such as in a powder form, onto the drum assembly. A corona wire may further provide a charge to paper or other print material, which may then be moved over the drum assembly. The paper or other print material may then pass through a fuser such that the applied toner is heated or otherwise caused to adhere to the paper or other print material. Upon depositing toner to the paper or other print material, the surface of the drum of the drum assembly may pass a discharge lamp where a light, or the like, may expose the drum to erase or remove the electrical image. In one embodiment, the drum surface of the drum assembly may then pass the corona wire, which may then reapply a charge. It should be noted that embodiments of the invention are not limited to this method of transferring data onto a print material, and other mechanisms may also be used. Thus, the invention is not to be constrained or otherwise narrowed by this embodiment.

Illustrative Mobile Device

Figure 3:
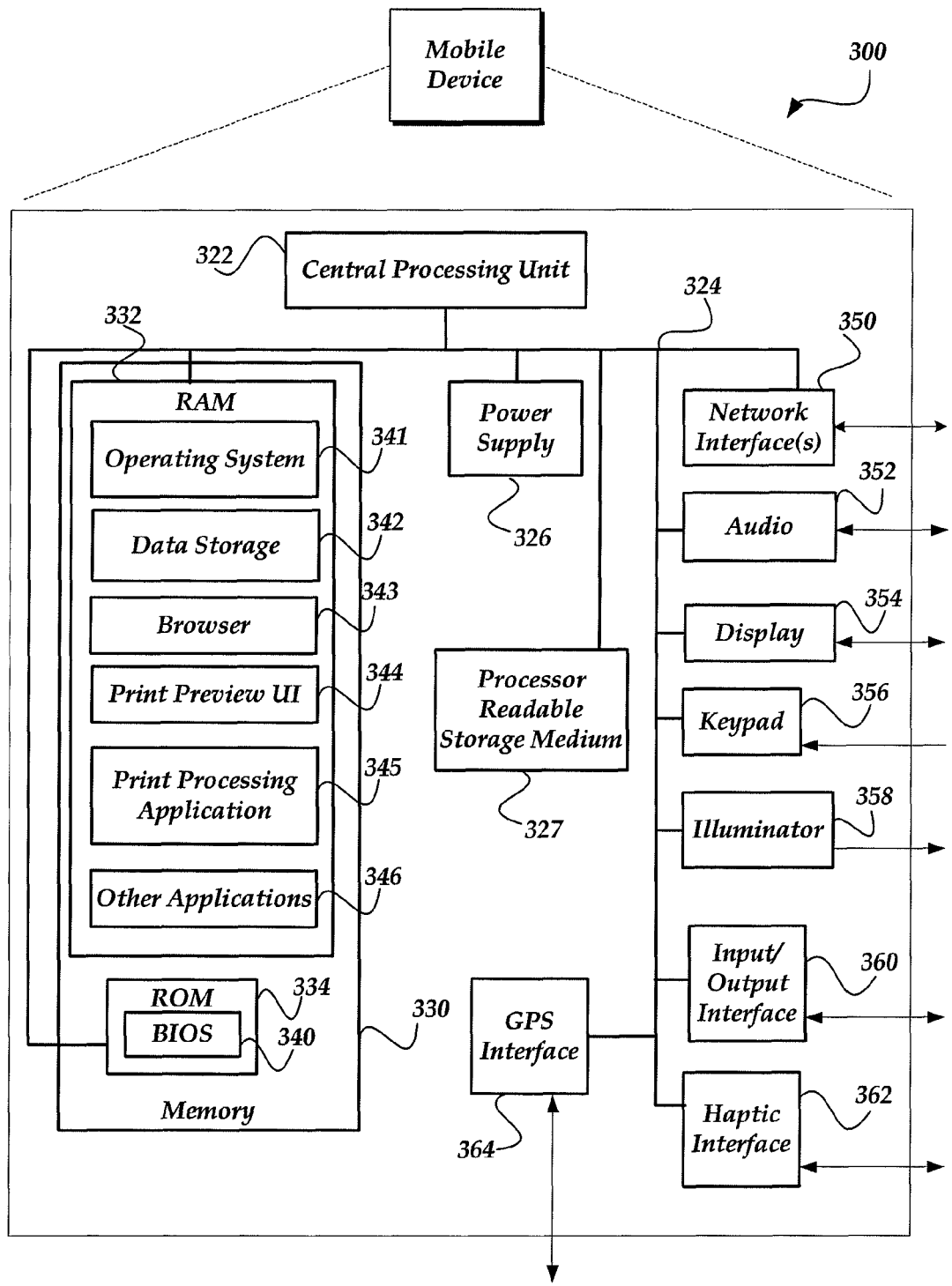
FIG. 3 shows an embodiment of a mobile device that may be included in a system such as that shown in FIG. 1.

FIG. 3 shows an exemplary mobile device 300, according to one embodiment of the invention. Generally, mobile device 300 may include more or fewer components than those shown. The components shown, however, are sufficient to disclose an illustrative embodiment for practicing the invention. Mobile device 300 may represent, for example, mobile client device 103 of FIG. 1.

Mobile device 300 includes central processing unit 322, power supply 326, processor readable storage medium 327, GPS interface 364, one or more network interfaces 350, audio interface 352, display 354, keypad 356, illuminator 358, input/output interface 360, haptic interface 362, and mass memory, all in communication with each other via bus 324. The mass memory generally includes RAM 332, ROM 334, and one or more removable or permanent mass storage devices such as processor readable storage medium 327. The mass memory may store operating system 341 for controlling the operation of client device 300. Operating system 341 may be stored in RAM 332. A general-purpose operating system may be employed, such as a version of UNIX or LINUX and the like. In some embodiments, operating system 341 may be a specialized client communication operating system such as Windows Mobile, Sybian, or the Apple iPhone operating system. The operating system may include or interface with a virtual machine module such as the Java virtual machine or Microsoft .NET runtime that may enable control of hardware components and/or operating system functions via applications that run under such virtual machines. Basic input/output system (BIOS) 340 may also be provided for controlling the low-level operation of mobile device 300, and may be stored in mass memory and in some embodiments in ROM 334.

Mobile device 300 may communicate with a base station (not shown), or directly with another computing device, via one or more network interfaces 350. Network interface(s) 350 may include circuitry for coupling mobile device 300 to one or more networks, and may be constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIPIRTP, Bluetooth™, infrared, Wi-Fi, Zigbee, or any of a variety of other wireless communication protocols. Network interface(s) 350 is sometimes known as a transceiver, transceiving device, or network interface card (NIC). Client device 300 may also communicate with a printing device or other devices via input/output interface 360, which may employ Firewire, a serial port, a parallel port, USB, or the like.

The mass memory as described above illustrates a type of computer-readable media, namely computer-readable or processor-readable storage media such as processor-readable storage medium 327 shown in FIG. 3. Computer-readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory such as RAM 332, ROM 334 and/or processor-readable storage medium 327 may also store program code and data. For example, RAM 332 may include a browser application such as browser 343. Other examples of application programs include transcoders, schedulers, calendars, database programs, word processing programs, HTTP programs, customizable user interface programs, IPSec applications, encryption programs, security programs, VPN programs, SMS message clients, IM message clients, email clients, account management and so forth. Applications in mass memory such as RAM 332 may also include print preview user interface (UI) 344 and/or print processing application 345, the operation of which are described more fully herein with regard to FIGS. 5-11. RAM 332 may also store other applications 346. Generally, any of the applications described herein may be loaded into mass memory and run on operating system 341, may utilize data storage 342 and/or processor-readable storage medium 327 for storing, caching, accessing data, may utilize display 354 for displaying information, may utilize audio interface 352 for conveying audio information, and may utilize haptic interface 362 for conveying haptic (e.g. tactile) information to a user of mobile device 300.

Power supply 326 may provide power to mobile device 300. A rechargeable or non-rechargeable battery may be used to provide power. Power may also be provided by an external power source, such as an AC adapter or a powered docking cradle that supplements and/or recharges a battery.

Audio interface 352 may be arranged to produce and receive audio signals such as the sound of a human voice, music, and the like. For example, audio interface 352 may be coupled to a speaker and microphone (not shown) to enable telecommunication with others and/or generate an audio acknowledgement for some action. Display 354 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 356 may comprise any input device arranged to receive input from a user. For example, keypad 356 may include a push button numeric dial, or a keyboard. Keypad 356 may also include command buttons that are associated with various functions of one or more application stored in mass memory and executed on operating system 341. Illuminator 358 may provide a status indication and/or provide light. Illuminator 358 may remain active for specific periods of time or in response to events. For example, when illuminator 358 is active, it may backlight the buttons on keypad 356 and stay on while the client device is powered. Also, illuminator 358 may backlight these buttons in various patterns when particular actions are performed, such as dialing another client device. Illuminator 358 may also cause light sources positioned within a transparent or translucent case of the client device to illuminate in response to actions.

Mobile device 300 may also include input/output interface 360 for communicating with external devices, such as a headset, with other input or output devices not shown in FIG. 3, or with other computing devices. Input/output interface 360 may utilize one or more communication technologies, such as USB, infrared, Bluetooth™, Wi-Fi, Zigbee, or the like. Haptic interface 362 may provide tactile feedback to a user of the client device. For example, the haptic interface may be employed to vibrate mobile device 300 in a particular way when another user of a computing device is calling.

GPS transceiver 364 may be configured to determine the physical coordinates of mobile device 300 on the surface of the Earth, by outputting a location as latitude and longitude values. GPS transceiver 364 can also employ other geo-positioning mechanisms, including, but not limited to, triangulation, assisted GPS (AGPS), E-OTD, CI, SA1, ETA, BSS or the like, to further determine the physical location of mobile device 300 on the surface of the Earth. It is understood that under different conditions, GPS transceiver 364 can determine a physical location within millimeters for mobile device 300; and in other cases, the determined physical location may be less precise, such as within a meter or significantly greater distances. The position information outputted by GPS transceiver 364 may be stored in mass memory (e.g. in data storage 342 and/or processor readable storage medium 327), and may be employed by various applications stored in mass memory and run in operating system 341, as described herein.

Though not shown in FIG. 3, mobile device 300 may further include a video/image capture interface that is arranged to capture video and/or still images. For example, video/image capture interface may incorporate a camera, and may comprise a lens, an image sensor, and other electronics. Image sensors may include a complementary metal-oxide-semiconductor (CMOS) integrated circuit, charge-coupled device (CCD), or any other integrated circuit for sensing light. Images and/or videos captures by such an interface may be stored to mass memory such as RAM 332, ROM 334, and/or processor-readable storage medium 327, and may also be communicated to other computing devices (e.g. printers 107-109) via network interface(s) 350.

Illustrative Network Device

FIG. 4 shows an exemplary network device 400, according to at least one embodiment of the invention. Generally, network device 400 may include more or fewer components than those shown. The components shown, however, are sufficient to disclose an illustrative embodiment for practicing the invention. Network device 400 may represent, for example, client device 101 and/or server device 105 of FIG. 1.

Network device 400 may include central processing unit 412, one or more network interfaces 410, input/output interface 442, hard disk drive 444, video display adapter 446, and mass memory, all in communication with each other via bus 414. The mass memory generally includes RAM 416, ROM 450, hard disk drive 444, and one or more removable or permanent mass storage devices such as processor readable storage medium 440. Mass memory may further include such storage devices as tape drive, floppy disk drive, optical drive, and the like. The mass memory may store operating system 420 for controlling the operation of network device 400. In some embodiments, operating system 420 may be stored in RAM 416. A general-purpose operating system may be employed, such as a version of UNIX or LINUX and the like. In some embodiments, operating system 420 may be a specialized client communication operating system such as Windows Mobile, Sybian, or the Apple iPhone operating system. The operating system may include or interface with a virtual machine module such as the Java virtual machine or Microsoft .NET runtime that may enable control of hardware components and/or operating system functions via applications that run under such virtual machines. Basic input/output system (BIOS) 450 may also be provided for controlling the low-level operation of network device 400, and may be stored in mass memory and in some embodiments in ROM 450.

Network device 400 may communicate with a network such as the Internet, or directly with another computing device, via one or more network interfaces 410. Network interface(s) 410 may include circuitry for coupling network device 400 to one or more networks, and may be constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIPIRTP, Bluetooth™, infrared, Wi-Fi, Zigbee, or any of a variety of other wired or wireless communication protocols. Network interface(s) 410 is sometimes known as a transceiver, transceiving device, or network interface card (NIC). Network device 400 may also communicate with a printing device or other devices via input/output interface(s) 442, which may employ Firewire, a serial port, a parallel port, USB, or the like.

The mass memory as described above illustrates a type of computer-readable media, namely computer-readable or processor-readable storage media such as processor-readable storage medium 440 shown in FIG. 4. Computer-readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory such as RAM 416, ROM 450, hard disk drive 444, and/or processor-readable storage medium 440 may also store program code and data. For example, RAM 416 may include a browser application such as browser 422. Other examples of application programs include transcoders, schedulers, calendars, database programs, word processing programs, HTTP programs, customizable user interface programs, IPSec applications, encryption programs, security programs, VPN programs, SMS message clients, IM message clients, email clients, account management and so forth. Applications in mass memory such as RAM 416 may also include print preview user interface (UI) 428 and/or print processing application 426, the operation of which are described more fully herein with regard to FIGS. 5-11. In some embodiments, print preview UI 428 and/or print processing application 426 may be included in network device 400 when such device is acting as a client device such as client device 101 of FIG. 1. RAM 416 may also store other applications 430. Generally, any of the applications described herein may be loaded into mass memory and run on operating system 420, may utilize data storage 424, processor-readable storage medium 440, and/or hard disk drive 444 for storing, caching, and/or accessing data associated with the applications.

At least some applications executing in mass memory of network device 400 may employ video display adapter 446 to output information for display to a user. In some embodiments, video display adapter 446 may be a video card, graphics card, video adapter, display adapter, graphics accelerator card, or the like. Video display adapter 446 may support one or more video and/or graphics formats for output, such as VGA, SVGA, XGA and the like. Video display adapter 446 may include software and/or hardware components for processing video and/or graphics, such as a Graphics Processing Unit (GPU), video and/or graphics BIOS, video and/or graphics firmware, and the like. Video display adapter 446 may further include dedicated memory for processing video and/or graphics. Video display adapter 446 may include one or more output ports, such as a Video Graphics Array (VGA) port, a Digital Visual Interface (DVI) port, a Video In Video Out (VIVO) port, a High-Definition Multimedia Interface (HDMI) port, DisplayPort, composite video port, and the like. Video display adapter 446 may interface with one or more external displays (e.g. monitors) or with a display integrated with network device 400, to display information to a user.

General Operation

It will be understood that each block of the illustrative flowcharts described below, and combinations of blocks in the flowcharts, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Figure 5:
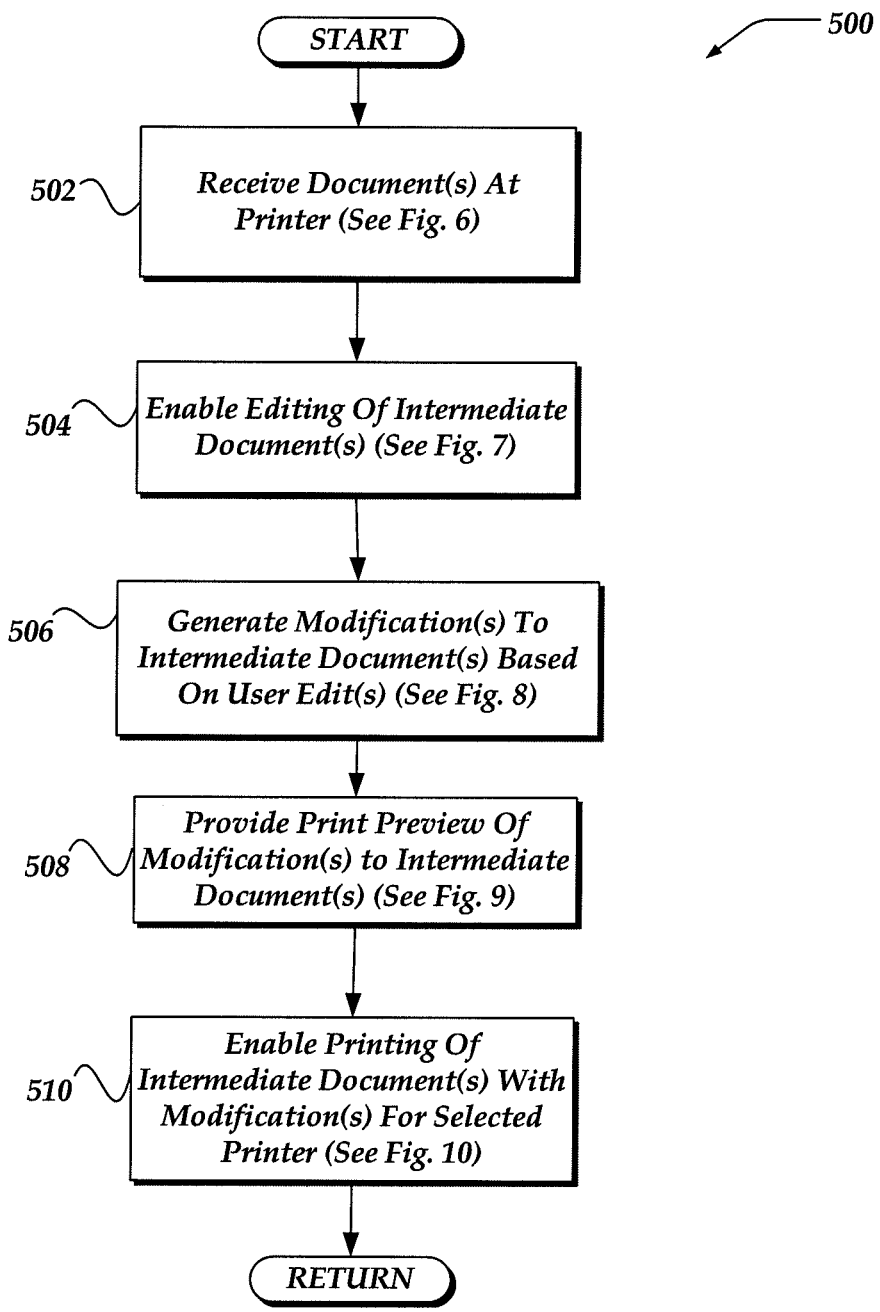
FIG. 5 illustrates a logical flow diagram generally showing one embodiment of a process for enabling modification of documents to be printed, and previewing modified documents.

FIG. 5 shows an exemplary process 500 that may be performed by embodiments of the claimed invention. In some embodiments, process 500 (and/or one or more of the processes depicted in FIGS. 6-10) may be implemented by one or more applications executing on a printing device such as printer 200 of FIG. 2, and/or one or more of printers 107-109 shown in FIG. 1.

As shown in FIG. 5, after a start block process 500 may proceed to block 502 where one or more documents may be received at a printer, such as a printer configured to perform embodiments of the claimed invention (e.g. one or more of printers 107-109 shown in FIG. 1). Block 502 is described in more detail herein with respect to FIG. 6. However, briefly stated the one or more documents received by a printer at step 502 may be document(s) associated with a print job that a user has requested to be printed at the printer. The received documents may include virtually any type of document that may be printed by a printing device. For example, the received documents may include text documents created by a text editor (e.g. Microsoft Word, Corel WordPerfect, TeX, OpenOffice, and the like), graphics documents created by a graphics painting program (e.g. Microsoft Paint, MacPaint, or other bitmap and/or vector-based graphics design software), image documents created by photographic systems, optical scanners, and the like, or documents that include any combination of text, graphics, images, and/or other visual representations of information.

In some embodiments, the document(s) may be received from a client device such as client device 101 and/or mobile client device 103 of FIG. 1. For example, a received document may be a photographic image generated by image-generating hardware (e.g. a camera) and/or software on a user's mobile client device 103 (e.g. a smart phone or PDA with photographic capability), and sent by the user to be printed at a printer such as printers 107-109 of FIG. 1. In another example, a received document may be a text and/or graphics document generated by the user employing word-processing software executing on the user's client device 101 and sent to be printed at one of printers 107-109.

The document(s) received at block 502 may be received via a communication over a network such as the Internet. The document(s) may be received as a shared print job via network download (e.g. via a web site through HTTP or other network protocol), as a secure job via some secure access (e.g. via an SSL-based or other secure connection, such as via a web site through HTTPS), or through a converter. The documents may be received in a format associated with a page description language (PDL) or printer command language (PCL), such as HP PCL, Postscript, PDF, XPS, or the like.

Process 500 may then proceed to block 504, where it may enable editing of intermediate documents by the user. Block 504 is described in more detail with regard to FIG. 7. However, briefly stated, at block 504 a user may be enabled to edit the received documents converted into an intermediate form, described in more detail herein. The user may be enabled to edit the documents via a print preview UI presented to the user in a display integrated with the printer itself (e.g. presented in display 244 of printer 200), and/or presented to the user on the user's client device (e.g. client device 101 and/or mobile client device 103). The various types of edits that may be available for the user to make are described further herein with regard to FIG. 7, and may include edits that introduce new content into a document (e.g. watermarks, sequential page numbering, header/footer, and the like) as well as edits that alter a layout and/or format of a document (e.g. pagination, n-up, scaling, color palette, and the like).

Process 500 may then proceed to block 506, where one or more modifications to the intermediate document(s) may be generated based on the user edits specified at block 504 through the print preview UI. Block 506 is described in more detail with regard to FIG. 8. However, briefly stated, at block 506 embodiments of the claimed invention may generate one or more overlays to incorporate additional content specified by the user such as overlays, headers, footers, sequential page numbering, and the like. In some embodiments, modifications may be modifications to one or more high-level objects that may be used to describe an intermediate form of the document. Such object modifications may be used to implement layout- and/or format-related edits, such as edits to color palette, page size, scaling, n-up, pagination, and the like.

Process 500 may then proceed to block 508, where certain embodiments may provide a print preview of the one or more modifications to the intermediate documents generated at block 506. Block 508 is described in more detail with regard to FIG. 9. However, briefly stated, at block 508 a preview of the intermediate documents, modified as specified by the user edits, may be shown to the user, for example through the print preview UI. Such a preview may provide the user with an opportunity to view the results of the user's edits, and may further provide the user with an opportunity to back out (e.g. remove) the edits, make additional edits, or make different edits if different modifications are needed.

Once the user has completed the edits to the document(s) and previewed the modified document(s) at block 508, process 500 may proceed to block 510 and enable printing of the intermediate document(s) with the user-specified modification(s) for a selected printer. Block 510 is described in more detail with regard to FIG. 10. After block 510, process 500 may return.

Figure 6:
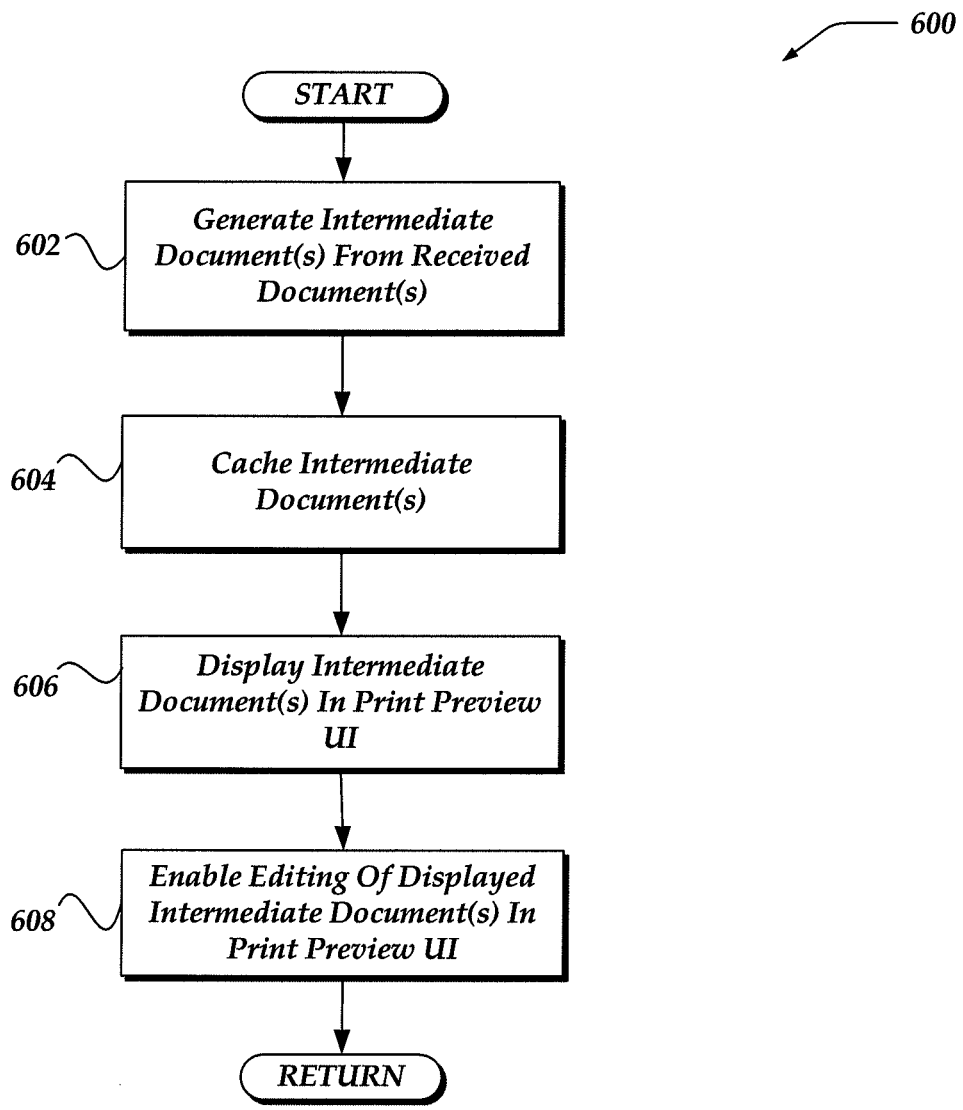
FIG. 6 illustrates a logical flow diagram generally showing one embodiment of a process for receiving documents at a printer.
Figure 11:
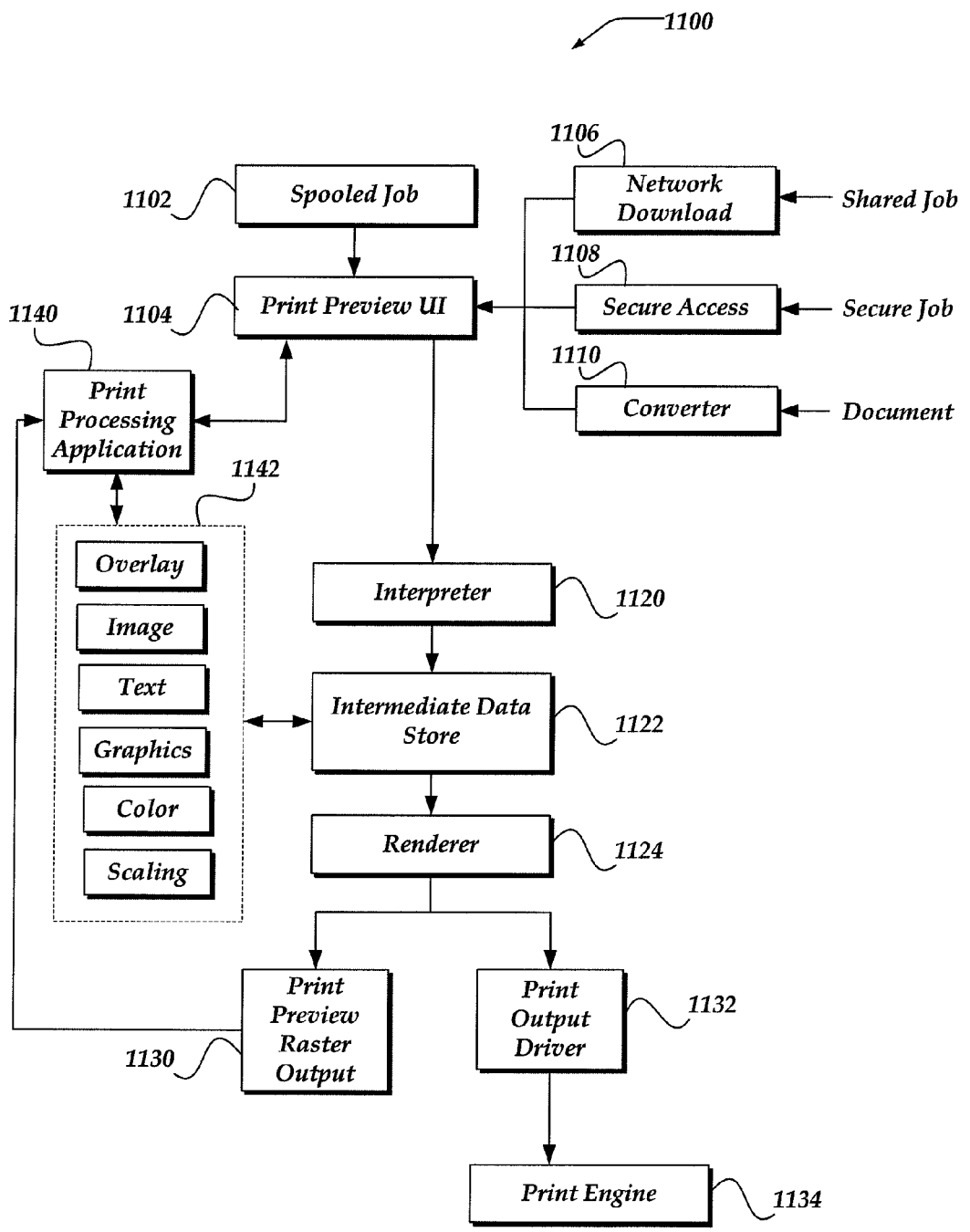
FIG. 11 illustrates a block diagram of one embodiment of a preview and print apparatus work flow.

FIG. 6 depicts in further detail an exemplary process 600 for receiving one or more documents at a printer, as described briefly with regard to block 502 of FIG. 5. After a start block, process 600 may proceed to block 602 where one or more intermediate documents may be generated from the received documents (e.g., the one or more documents received as part of a print job at block 502 of process 500). In some embodiments, generation of intermediate documents from received documents may include a translation and/or an interpretation of the received documents. Received documents may be received as an input data stream, with data in a PDL such as HP PCL, Postscript, PDF, XPS, XL, or the like. In some embodiments, such input data stream may be consumed by an interpreter (e.g., interpreter 1120 as shown in FIG. 11) which may then generate a first set of graphic objects. In some embodiments, this first set of graphic objects may be considered high-level graphic objects. The first set of graphic objects (e.g. high-level objects) may be described using a set of coordinates and color palette associated with the source of the documents (e.g. user coordinates and source color). Such high-level objects may be suitable for repurposed rendering, and may be modified as the user specifies edits to be made to the document(s).

The first set of graphic objects may then be decomposed (e.g. by interpreter 1120 or some other program, application, and/or software module such as a page description interface) into a second set of graphic objects. In some embodiments, this second set of graphic objects may be considered low-level graphic objects. The second set of graphic objects may be described using a set of coordinates and color palette associated with the printing device on which the documents are to be printed (e.g. device coordinates and color). In this way, the low-level objects may be bound to the target printing device. In some embodiments, the second set of graphic objects (e.g. low-level objects) may be stored in an intermediate data structure as a common display list, which may then be rendered to generate an image of the page to be printed, as described further herein. The documents interpreted and/or translated into such an intermediate data structure may be described as an intermediate version of the document(s), an intermediate representation of the document(s), intermediate data representation of the document(s), and/or intermediate document(s).

Process 600 may then proceed to block 604, where the one or more intermediate documents may be cached. In some embodiments, caching may include storing the intermediate documents in mass memory as described with regard to printer 200 in FIG. 2. However, the claimed invention is not limited to using any particular storage, and intermediate documents may be stored and/or cached on separate device such as server device 105 as shown in FIG. 1, or in mass memory on a client device such as devices 101 and/or 103 shown in FIG. 1. In some embodiments, caching of the intermediate documents may be temporary caching, such that the intermediate documents remain cached until the print job is complete (e.g. until the documents have been printed), or while a user session is in progress (e.g. in cases where the user is required to log in to the system, until the user logs off or exits). In some embodiments, the intermediate documents may remain in the cache for a certain predetermined period of time (e.g. one day). Temporary caching may be necessary in embodiments where there is a limit on the amount of memory storage available for caching. In some embodiments, an intermediate document may remain cached for an indefinite period of time, or until overwritten by an updated intermediate version of the same document. Caching of the intermediate document(s) may allow process 600 to avoid redundant interpretation of jobs, allow reuse of the intermediate document(s) within the same and/or a different editing session by the same and/or a different user, and/or may provide for a quicker response to interactive requests by a user.

Process 600 may then proceed to block 606, where the intermediate document(s) may be displayed in a print preview user interface (UI). In some embodiments, the print preview UI (e.g. print preview UI application 224 as shown in FIG. 2) may be presented to the user in a display (e.g. display 244 in FIG. 2) that is incorporated into the printer device. In some embodiments, such a display may be an LCD display, though other types of displays may be used. In some embodiments (e.g. in cases where the display device lacks a display that can present the print preview UI), the print preview UI may be presented to the user on a display that is in communication with, or incorporated into, a client device such as client device 101 or mobile device 103 of FIG. 1. In some embodiments, displaying the intermediate document(s) in the print preview UI may include generating an image that is appropriately sized for the display. Such sizing may be performed by the print preview UI application or in some embodiments by a separate application, such as the print processing application 222 of FIG. 2. Some embodiments of the invention may provide various filter architecture elements (e.g. filters, scaling tools, color correction tools, and the like) to enable a user to select, adapt or otherwise tune the display for different purposes, preferences, displays, and/or printing devices. Such filter architecture elements may enable a high quality display of the documents to be printed, and may further include various down-sampling algorithms for scaling, various color correction algorithms, and the like. Process 600 may then proceed to block 608, where embodiments of the claimed invention may enable editing of the displayed intermediate documents in the print preview UI by the user. Process 600 may then return.

Figure 7:
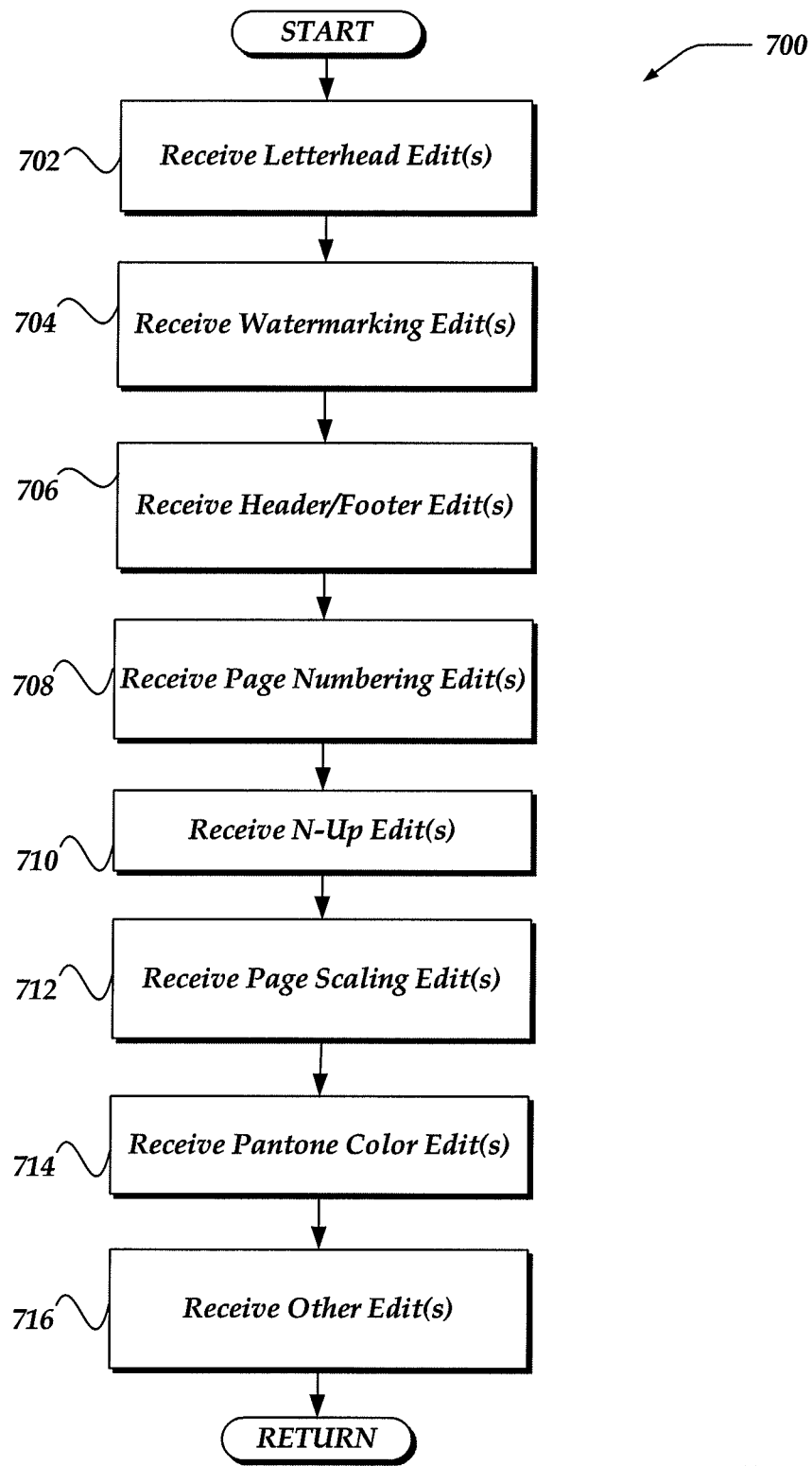
FIG. 7 illustrates a logical flow diagram generally showing one embodiment of a process for enabling editing of intermediate documents.

FIG. 7 depicts in further detail an exemplary process 700 for enabling editing of one or more intermediate documents, as described briefly with regard to block 504 of FIG. 5 and block 608 of FIG. 6. In some embodiments, the intermediate document(s) may be presented to the user in the print preview UI which may include functionality to enable the user to make one or more edits to the intermediate document(s) prior to printing the documents. Various types of edits to the intermediate document(s) may be made by the user in the print preview UI. The edits made may be received by software implementing the claimed invention, such as print processing application 222. After a start block, process 700 may begin receiving indications of edits specified by the user to the intermediate document(s). Each subsequent block of FIG. 7 depicts process 700 receiving a different type of edit. However, it should be noted that at each block, process 700 may receive some or no edits of the type specified (that is, the process is not constrained to necessarily receive every type of edit listed). Embodiments of the claimed invention enable the user to specify any combination of the available edits, and in some cases the user may not specify any edits to the intermediate document(s).

At block 702, process 700 may receive zero or more edits to the letterhead of the intermediate document(s). Such edits may include adding a particular letterhead (e.g. for a company, firm, individual, etc.) to documents that previously lacked a letterhead. Such edits may also include replacing a letterhead with a different letterhead, and/or removing a letterhead from the intermediate document(s).

At block 704, process 700 may receive zero or more edits associated with watermarking. Generally, a watermark may include text, an image, or any recognizable pattern that is added to a document with a specified shade of lightness/darkness (e.g. specified by the user). Edits associated with watermarking may include the user's specification of the text or other pattern to be used for the watermark (e.g. "Confidential") and/or the level of lightness/darkness (e.g. opacity) that the user has specified for the watermark. In some embodiments, opacity may be described as a percentage (e.g. 0%=transparent, 100%=opaque) or as a numeric value on a predefined scale (e.g. 0.0=transparent, 1.0=opaque). In some embodiments, the watermark may be applied to every page in the intermediate document(s) edited. In some embodiments, the user may specify that the watermark be applied to one or more identified pages within the intermediate document(s). Watermarking edits may also include information for the position of the watermark on the one or more pages, as well as font, font size, color, and/or other format information to be applied to the watermark text.

At block 706, process 700 may receive zero or more edits for header and/or footer of the intermediate document(s). A header generally refers to a portion of text or other information that appears at the top of a printed page and is separated from the main body of the page. A footer generally refers to a portion of text or other information that appears at the bottom of a printed page and is separated from the main body of the page. User-specified edits to header and/or footer may include adding a particular header and/or footer to intermediate document(s) that previously lacked a header and/or footer, replacing an existing header and/or footer with a different header and/or footer, or removing an existing header and/or footer from the intermediate document(s). Edits to header and/or footer may include the text and or other information to be included in the header and/or footer, and may also include the user-specified font, font size, color, alignment information (e.g., centered, left-justified, right-justified), or other format information for the header and/or footer. User-specified edits to header and/or footer may include the user's specification for which pages of the intermediate document(s) to apply the header and/or footer (e.g. all pages of the intermediate document(s), or one or more specified pages in the intermediate document(s)). Edits to header and/or footer may also include different headers/footers to be applied to different pages of the intermediate document(s) or different documents.

At block 708, process 700 may receive zero or more edits for page numbering of pages in the intermediate document(s). In some embodiments, page numbering edits may specify sequential numbering of pages within the intermediate document(s) (e.g. Bates numbering) such that each page has a different number in a sequence. Page numbering may include numeric characters, but may also include alphanumeric or other types of characters as specified by the user. Page numbering edits may include the user's specification of location on the page for the number (e.g. top of page, bottom of page), font, font size, color, alignment information, or other format information as specified by the user. Page numbering edits may also include the user's specification of a start number and/or end number for the numbering, and may also include a user's specification of an interval for page numbers in a sequence (e.g. interval of 2, for numbering 2, 4, 6, 8, 10, and so forth). User-specified edits for page numbering may include the user's specification for which pages of the intermediate document(s) to apply the numbering (e.g. all pages of the intermediate document(s), or one or more specified pages in the intermediate document(s)). Edits for page numbering may also include different sequential page numbering to be applied to different pages of the intermediate document(s) or to different documents.

At block 710, process 700 may receive zero or more edits for N-Up of pages. N-Up generally refers to the printing of multiple pages of a document on one sheet (e.g., printing two document pages per sheet, four document pages per sheet, etc.). In some embodiments, the user's specification of N-Up edits to the intermediate document(s) may include information for the number of pages to be printed per sheet, and may also include information regarding the orientation of pages on a sheet (e.g. portrait or landscape orientation).

At block 712, process 700 may receive zero or more edits for page scaling of pages within the intermediate document(s). Page scaling may include horizontal scaling and/or vertical scaling of one or more pages of the intermediate document(s). In some embodiments, user specification of scaling may include a percentage indication of horizontal and/or vertical scaling (e.g. 50%), or it may include a specification of scaling in the form of a ratio (e.g. 2/1, 4/1, and so forth).

At block 714, process 700 may receive zero or more edits related to color, as specified by the user. In some embodiments, color-related edits may include a user's specification of a color palette to be used in the printed document. Such color palette may be a specification of the number of colors used, and in some embodiments may be in the form of a number of bits necessary to describe each of the supported colors uniquely (e.g. 8-bit, 24-bit color palette, and so forth). In some embodiments, the print preview UI may enable the user to specify that the intermediate document(s) are to be printed in grayscale. In such cases, the color-related edits may include an indication that the intermediate document(s) are to be printed in grayscale. In some embodiments color-related edits may include a specification of one or more particular colors to be used to print the intermediate document(s). For example, the user may specify one or more colors with particular identifiers (e.g. Pantone numbers) to be used.

At block 716, process 700 may receive zero or more edits of various other types. Such other edit types may include edits related to secure job management, edits related to position of the page such as user-specified pan and/or rotation of one or more pages of the intermediate document(s), edits related to the addition of lines (e.g. horizontal lines, vertical lines, or otherwise) to one or more pages of the intermediate document(s), edits related to the addition of rectangles or other shapes, filled or otherwise, to one or more pages of the intermediate document(s), edits generally related to the addition of images, graphics, and/or text to one or more pages, edits related to cropping (e.g. the user selecting a portion of a page to print), and so forth. Process 700 may then return. Some embodiments may enable a user to redact certain text, graphical, image or other elements of the intermediate document(s), and remove or block out certain words for example (e.g. company names, private information, privileged information, etc.).

Figure 8:
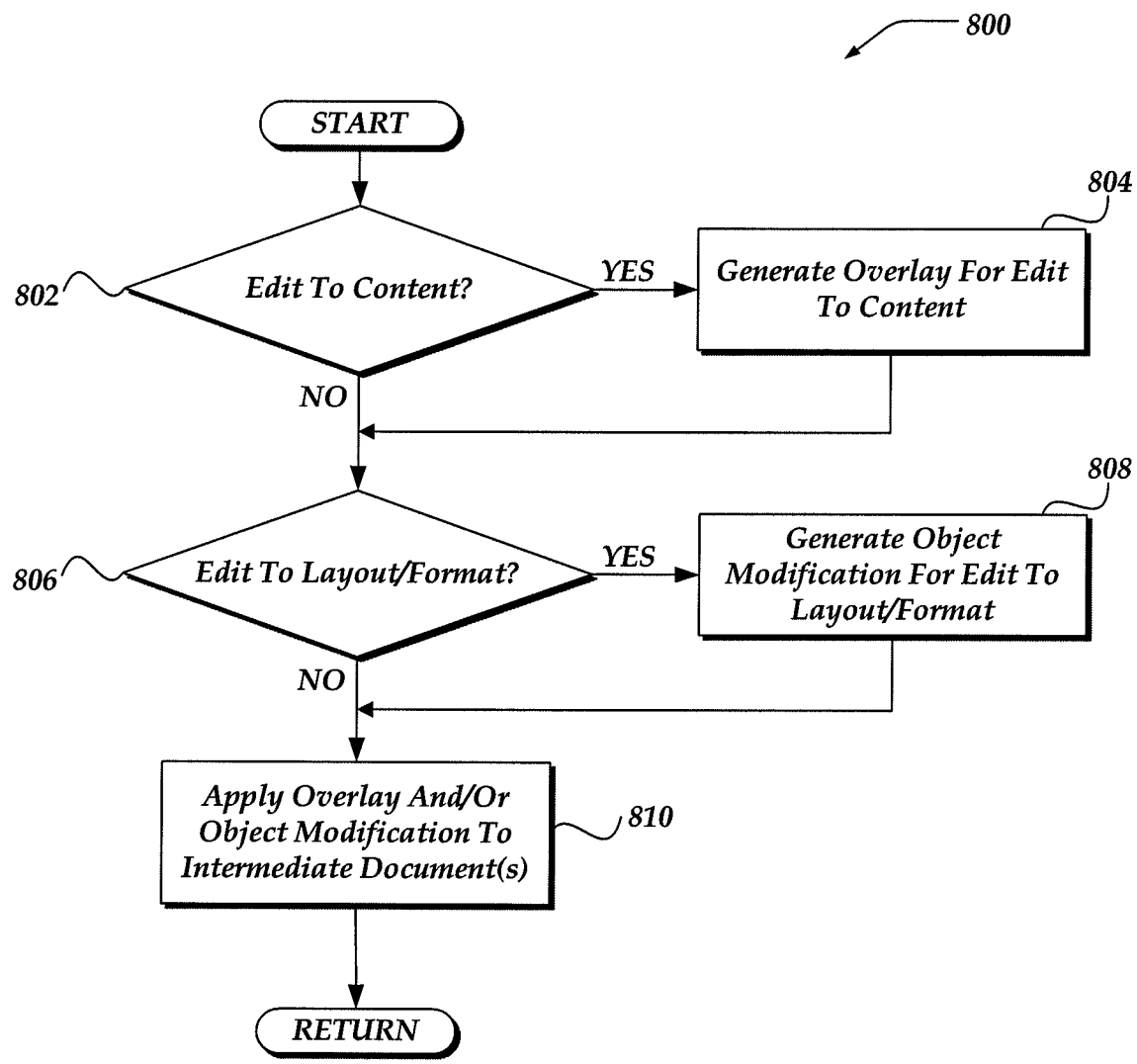
FIG. 8 illustrates a logical flow diagram generally showing one embodiment of a process for generating modifications to intermediate documents based on user edits.

FIG. 8 depicts in further detail an exemplary process 800 for generating one or more modifications to intermediate documents based on user edits, as described briefly with regard to block 506 of FIG. 5. After a start block, process 800 may proceed to a decision block 802 and determine whether an edit received (e.g. such as the one or more user edits received in process 700) is to content of one or more pages of the intermediate document(s). In some embodiments, edits to content may generally include virtually any edit that adds content to the intermediate document(s). Such edits to content may include watermarks, headers, footers, page numbering, letterhead, and so forth.

In some embodiments, if process 800 determines at decision block 802 that there are one or more edits to content, the process may proceed to block 804 where one or more overlays are generated for the edit(s) to content. Generally, such overlays enable new content to be added to an existing page of the intermediate document(s). In some embodiments, ability of the claimed invention to add overlays may include edits that involve the addition of text (scalable or otherwise) and/or rectangular rulings. In some embodiments, overlays may also include images such as corporate logos and the like. Use of overlays for adding content to the intermediate document(s) may enable embodiments of the claimed invention to reuse the generated overlays for multiple pages of the intermediate document(s) (e.g. where the same or similar content is being added to each page of a document), and may enable more efficient modification given that the same or similar overlays may be applied to multiple pages.

After block 804, or if decision block 802 determines there are no edits to content, process 800 may proceed to decision block 806, where it may determine whether the user has specified one or more edits to layout and/or format of pages of the intermediate document(s). Such edits may include N-Up edits, page scaling edits, edits related to color palette, and the like. Generally, such edits may include those edits that do not involve making the same or similar changes to multiple pages of the intermediate document(s), such that use of overlays may not be appropriate.

In some embodiments, if process 800 determines at decision block 806 that there are one or more edits to layout and/or format, the process may proceed to block 808 where one or more object modifications may be generated for the edit(s) to layout and/or format. In some embodiments, such object modifications may be made to the previously discussed second set of objects (e.g. low-level objects) stored in an intermediate data structure. In such a case, the layout/format-related edits may be made as edits to the common display list that includes the low-level objects that describe the intermediate document(s).

After block 808, or if decision block 806 determines there are no edits to layout and/or format, process 800 may proceed to block 810 where the generated overlays and/or object modifications may be applied to the intermediate documents. Following block 810, process 800 may return, or may in some embodiments proceed to process additional received user edits to the intermediate document(s). In some embodiments, all or part of process 800 may be performed by the print preview UI application (e.g. print preview UI 224), or by a separate application (e.g. print processing application 222) executing on printer 200. In some embodiments, such applications may execute on server device 105, client device 101, and/or mobile device 103.

Figure 9:
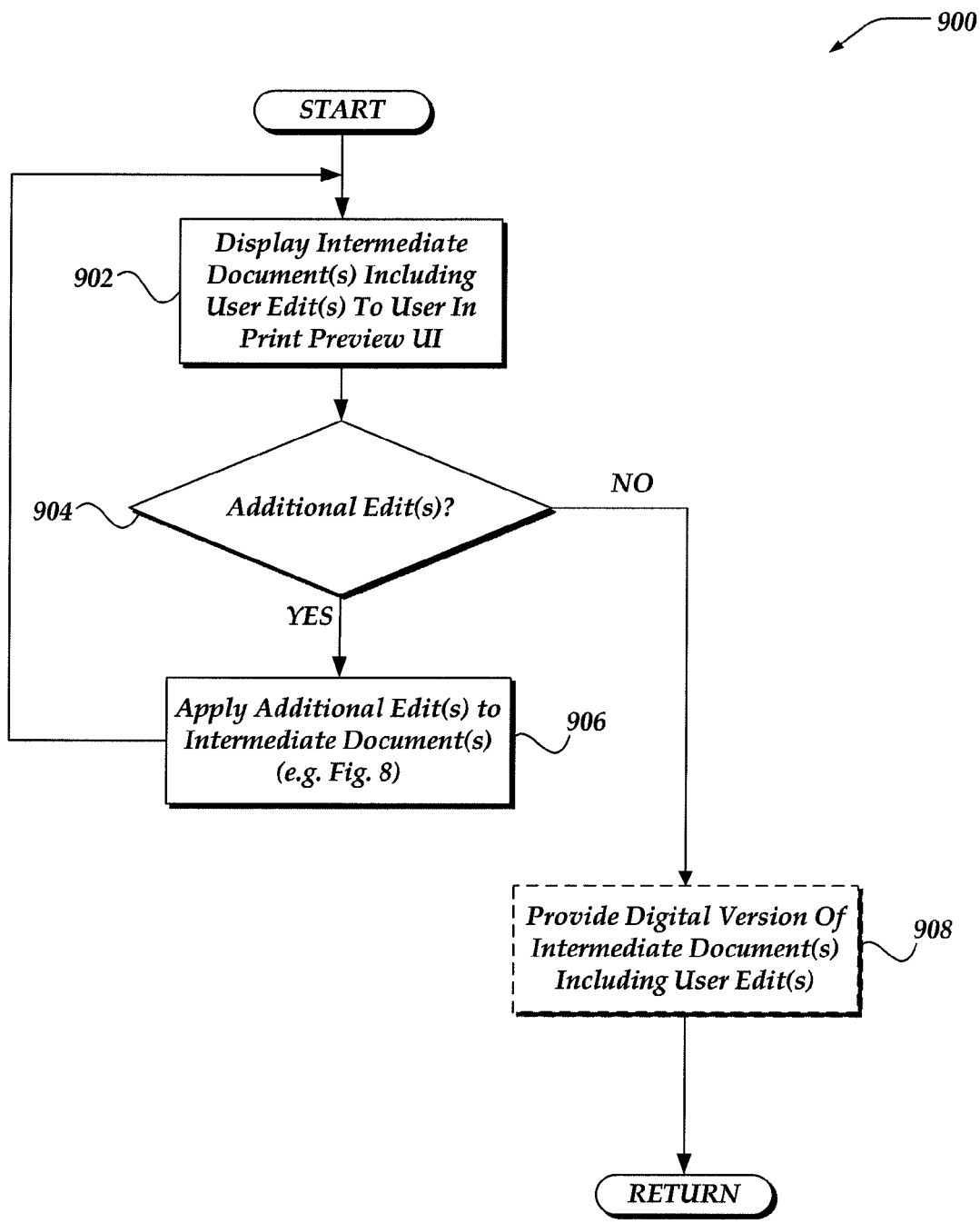
FIG. 9 illustrates a logical flow diagram generally showing one embodiment of a process for providing a print preview of modifications to intermediate documents.

FIG. 9 depicts in further detail an exemplary process 900 for providing a print preview of modifications to intermediate documents, as described briefly with regard to block 508 of FIG. 5. After a start block, process 900 may proceed to block 902 to display intermediate document(s) including the user edit(s) to the user. Such display may take place after the user's specified edits have been applied to the intermediate document(s) (e.g. as described with regard to FIG. 8), and may therefore enable the user to see the effects of his/her specified edits. In some embodiments, display of the modified intermediate document(s) may be made through the print preview UI, for example on display 244 of printer 200, or on the display of a client device such as devices 101 and/or 103 of FIG. 1.

Process 900 may then proceed to decision block 904, where a determination may be made whether there are additional edits. If decision block 904 determines there are additional edits, process 900 may proceed to block 906, where the additional edits may be applied to the intermediate document(s) (e.g. as described with regard to FIG. 8). Process 900 may then return to block 902 where the intermediate document(s) including such additional edits may be displayed to the user.

If decision block 904 determines there are no additional edits, process 900 may proceed in some embodiments to block 908. At block 908, process 900 may provide one or more digital versions of the intermediate document(s) including the user edit(s). In some embodiments, such a digital version may be provided instead of a printed version of the modified intermediate document. In some embodiments, a digital version may be provided in addition to a printed version. Such digital versions may include, but are not limited to, an electronic file in a bitmap/raster image format (e.g. JPEG, GIF, BMP), vector image format (e.g. SVG, CGM), or any other document format such as PDF and the like. In some embodiments, a digital version may be stored in mass memory such as RAM 216, ROM 250 or processor readable storage medium as shown in FIGS. 2, 3 and 4, in mass memory of a client device, or on a portable processor readable storage device (e.g. a flash drive, hard disk, tape drive, and the like). In some embodiments, functionality may enable a user to send the digital version, e.g. by fax, email, instant message, SMS, MMS, or other messaging methods. For example, a user interface such as the exemplary user interfaces of FIGS. 12-14 (described further herein) may include functionality to enable a user to control whether a digital version is created and what format it is created in. A user interface may also allow the user to control the storage of the digital version (e.g. select a filename and/or location to store the digital version). A user interface may also allow a user to control the sending of the digital version (e.g. select a source address, a destination address and/or messaging method). For example, a user may have an image or other document stored on a flash drive or mobile device, and may use the document editing functionality described herein to add text, add a watermark or make other edits to the document. The edited document may then be stored on the user's flash drive or mobile device, and/or sent via email, fax or the like to another person or to the user herself. Following block 908, process 900 returns.

In some embodiments, process 900 may be an iterative process, receiving user edits and displaying the results of the user edits, thus providing the user with feedback (e.g. more or less immediate feedback) of the results of his/her specified edits, and enabling the user to modify the edits or specify different edits as needed until the user is satisfied with the resulting modified document, which may then be printed and/or provided as a digital version.

Figure 10:
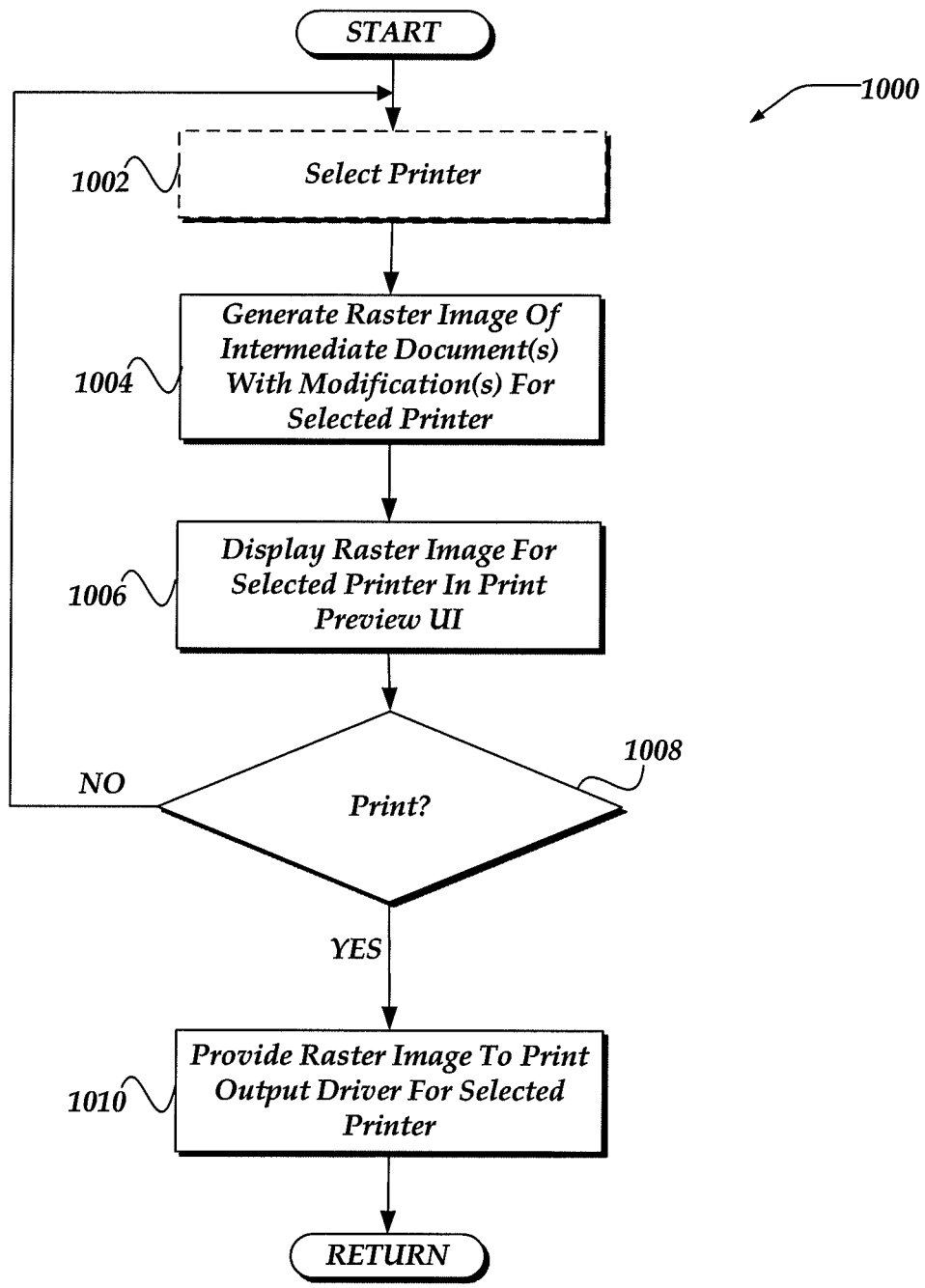
FIG. 10 illustrates a logical flow diagram generally showing one embodiment of a process for enabling printing of intermediate documents with modifications for a selected printer.

FIG. 10 depicts in further detail an exemplary process 1000 for enabling printing of intermediate documents with modifications for a selected printer, as described briefly with regard to block 510 of FIG. 5. After a start block, process 1000 may proceed to block 1002 where, in some embodiments, the user may be enabled to select a printer. Block 1002 may be optional among various embodiments of the claimed invention, and may be supported for those configurations of system 100 where there may be more than one printing device available to the user for printing documents. For example, FIG. 1 depicts at least three separate printers (e.g. elements 107-109, printer A, printer B and printer C) in an exemplary configuration of system 100. Such printers may have different capabilities. For example, various printers may support different fonts, different color palettes, different page sizes, different N-Up specifications, and the like. In some embodiments, the user may be enabled to select a particular printer from a list of available printers (e.g. in a drop-down list, control, dialog, or the like) in the print preview UI.

Process 1000 may then proceed to block 1004, and generate a raster image of the intermediate document(s) with the modification(s). In some embodiments where there are more than one printing devices available for the user, the raster image generated may be generated for the printer selected at block 1002. In general, the raster image may be generated based on intermediate document(s) modified through application of generated overlays for additional content and/or modifications to objects (e.g. low level objects) corresponding to layout/format edits, as discussed herein with regard to FIG. 8. In some embodiments, because the low-level objects are bound to the selected printer (e.g. generated based on the particular capabilities of the printer), the generated raster image is generated for the printer where the document(s) are to be printed. In some embodiments, such binding of low-level objects to printer capabilities enables the displayed raster image to be a close representation (in some cases, the best possible representation) of the printed page on the display screen—i.e., an accurate (or as accurate as possible) preview of the printed modified document(s) on the display, prior to printing. In this way, embodiments of the invention may provide a high quality display of the document(s) to be printed, on a display screen that may be small or otherwise limited in size (e.g. may be smaller than the dimensions of the document to be printed). At block 1006, the generated raster image may be displayed in the print preview UI to the user.

In some embodiments, generation of the rasterized image of the modified document(s) may be optimized and/or accelerated to enhance usability and/or performance of the print preview UI, for example to limit the amount of time a user has to wait to see a rasterized image that includes the user's specified modifications. In some embodiments, caching of the intermediate document and/or low-level objects for the document may enable such acceleration.

Process 1000 may then proceed to decision block 1008, where it is determined whether the user has elected to print the document(s). In some embodiments, print preview UI may include a "print" button or other control that allows the user to print the document(s), if the user decides that the generated raster image of the modified document(s) is suitable for his/her needs. If the decision is made to print, process 1000 may proceed to block 1010 where the raster image may be provided to a print output driver for the selected printer, to enable the printing of the document(s) modified per the user's edits. If the user's elects not to print at decision block 1008, process 1000 may return to block 1002 where the user may select a different printer if more than one printer is available. In this way, the user may be enabled to experiment to see how the modified document(s) may look after being printed by various printers and thus select a printer most suitable to the user's needs. Though not shown in FIG. 10, a "no" decision at block 1008 may also enable the user to make additional and/or different edits to the intermediate document(s) and have such edits applied to the intermediate document(s) as described with regard to FIGS. 7-8. Thus, embodiments of the claimed invention may permit the user to experiment with (e.g. try out) different modifications and/or different printers, and tune the appearance of the document(s) to be printed, to determine an optimal set of modifications and/or selected printer to suit the user's needs.

FIG. 11 illustrates a block diagram of an example of a preview and print apparatus work and/or control flow 1100 that may be implemented with embodiments of the invention. The exemplary work flow depicted may be implemented on a printing device such as printer 200 of FIG. 2 and/or printers 107-109 shown in FIG. 1. However, the claimed invention is not so limited. For example, in some embodiments various elements of work flow 1100 may be implemented on different devices of the exemplary system 100 of FIG. 1 without departing from the scope or spirit of the claimed invention.

As shown in work flow 1100 of FIG. 11, print preview UI 1104 may receive one or more print jobs including one or more documents to be printed. Such print jobs and/or documents may be received via various sources. Print jobs and/or documents may be received in a spooled job 1102, as a shared job via network download 1106 (e.g. HTTP download), as a secure job via secure access 1108, or as a document via converter 1110. In various embodiments, print jobs may be retrieved from a job spool queue, a local disk, a thumb drive, remote repositories of documents, and/or virtually any other source where documents to be printed may be received.

In some embodiments, print preview UI 1104 may display the one or more documents received to the user. Print preview UI 1104 may provide to the user a preview of the document(s) to be printed. In some embodiments, print preview UI 1104 may manipulate an image of the document(s) to simulate the printed output for the document(s). As discussed further herein, print preview UI may enable a user to select for editing one or more of the received document(s), and make one or more edits to the selected document(s) prior to printing. In some embodiments, this may include receiving from the user one or more commands and/or operations specifying edits to be made to the document(s). In some embodiments, print preview UI may provide a selection of scaling, filtering, and/or color correction tools to allow the output (e.g. the displayed document(s)) to be tuned to the display. In some embodiments, print preview UI may enable various functionality including but not limited to panning, zooming and rotating the image, to provide the user with different views of the document(s) to be printed.

For example, embodiments of the invention may support "walk-up" printing from a portable device such as a mobile device (e.g., cell phone, PDA, smart phone and the like) or from a thumb drive or other storage device. A user may have stored one or more documents to be printed on such a device, and may walk up to the printer, make a connection from the user's device to the printer (e.g. a Bluetooth or network connection between a mobile device and the printer, or by plugging the thumb drive or other storage device into a compatible port on the printer), download the document(s) to the printer, view them in the print preview UI 1104, and specify one or more edits to the document(s) prior to printing them.

In some embodiments, where document(s) are received via a secure connection and/or through a secure job management system, print preview UI 1104 may require some form of user authentication before allowing the user to access the document(s) for editing. For example, print preview UI may prompt for a username and/or password, or some other security credential. In some embodiments, the printer may include a smart card reader or similar security device, by which a user inserts a smart card or other security token (e.g. dongle) for authentication prior to editing. In some embodiments, authentication of the user may take place via a network device in communication with the printer, for example via server device 105 shown in FIG. 1.

Interpreter 1120 may receive the one or more documents from the print preview UI, and may interpret, translate, and/or convert the received documents into an intermediate form (e.g. intermediate documents) as discussed herein with regard to FIG. 6. For example, in some embodiments, interpreter 1120 may interpret the documents received in PDL form and generate one or more high level objects associated with the source of the documents (e.g. in user's coordinates and/or source color palette). In some embodiments, interpreter 1120 may further decompose the high level objects into low level objects, where the low level objects are bound to or otherwise associated with the printing device where the documents are to be printed (e.g. in printer device coordinates and/or printer device-supported color palette).

Interpreter 1120 may be in communication with intermediate data store 1122, which may store the high level objects (e.g. the intermediate documents). In some embodiments, storage of the high level objects may enable repurposed rendering, such that the high level objects may be reused and/or repurposed in various iterations of user edits. In some embodiments, intermediate data store 1122 may also store low level objects (e.g. the low level objects bound to the target printing device) generated by interpreter 1120.

Intermediate data store 1122 may be in communication with renderer 1124, which may translate the intermediate documents and/or the low level objects in preparation for generating a raster image (e.g. as discussed with regard to FIG. 10). In some embodiments, the raster image generated may be based on the support format and/or capabilities of the printer device where the documents are to be printed. In this way, the generated raster image may be a close representation (in some cases, the best possible representation) of the printed page as it is to be printed on the printing device—i.e., an accurate (or as accurate as possible) preview of the document(s) to be printed as modified by the user's edits. In some embodiments, renderer 1124 may be in communication with print preview raster output 1130 which may generate the raster image based on the translated intermediate documents. In some embodiments, renderer 1124 may translate the intermediate documents as well as generate the raster image of the documents. Print preview raster output 1130 and/or renderer 1124 may be in communication with print preview UI 1104, and may provide the generated raster image to the print preview UI for display to the user, and thus enable the user to make edits to the document(s) prior to printing.

In some embodiments, user edits (made by a user via print preview UI 1104) may be received and/or processed by print processing application 1140. In some embodiments, print processing application 1140 may provide a backend to print preview UI to process the user edits to the document(s). As discussed herein, such user edits may include edits that add additional content to a document, such as letterhead, watermarking, header, footer, page numbering, adding text, images and/or graphics to the document, and the like. Such edits may be incorporated into the intermediate documents through use of overlays. Further, user edits may include edits that alter the format and/or layout of a document, such as edits related to N-Up, page scaling, color palette, and the like. Print processing application 1140 may receive the one or more edits specified by the user in print preview UI 1104, and may edit and/or modify the document(s) based on the specified edits. Examples of the various types of edits available to the user are included in element 1142 of FIG. 11. In some embodiments, print processing application 1140 may cache information related to the user edits in storage, such as in intermediate data store 1122 or other mass memory. Such caching may enable the user to reuse specified edits, apply previously made edits to a different document, restore an editing session from the cached data, and the like. Print processing application 1140 may apply the user edits to the document(s) by way of modifications, generated as described in FIGS. 7-9. In some embodiments, the print processing application 1140 may invoke renderer 1124 to translate graphical objects to a raster image.

In some embodiments, user editing of the document(s) prior to printing may be an iterative process. For example, document(s) to be printed may be displayed (e.g. previewed) in print preview UI 1104 for the user, either in their received PDL format, in an intermediate format (e.g. as the intermediate document(s) described herein), and/or in a raster image based on low level objects bound to the printing device. The user may then specify one or more edit(s) to be made, those edits may be applied to the document(s) by print processing application 1140, and the document(s) may be re-rendered and/or re-rasterized to generate an updated raster image of the document(s) that incorporate the user edits as modifications. The user may then selected different edits, new edits, and/or may undo previously selected edits, and repeat the process until the user is satisfied with the document modifications. At that point, the user may select to print the document(s), in some embodiments through a print button or other control presented on the print preview UI 1104. Selecting print may cause the modified intermediate document(s) to be sent to print output driver 1132, and from there to the print engine 1134 which may control printing of the modified document(s) on a printing device.

Figure 12:
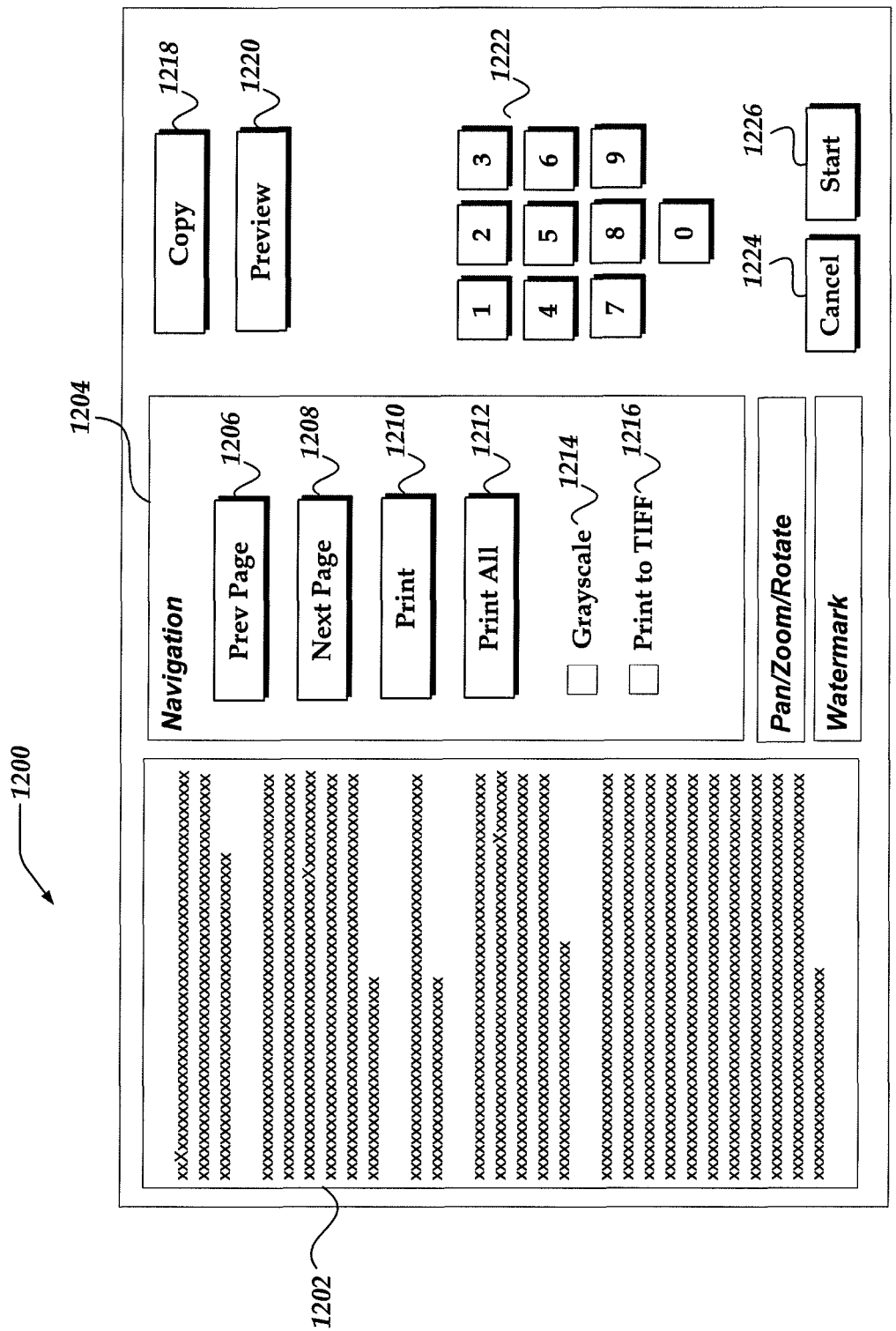
FIGS. 12-14 illustrate exemplary user interfaces that may be implemented as part of an embodiment.
Figure 13:
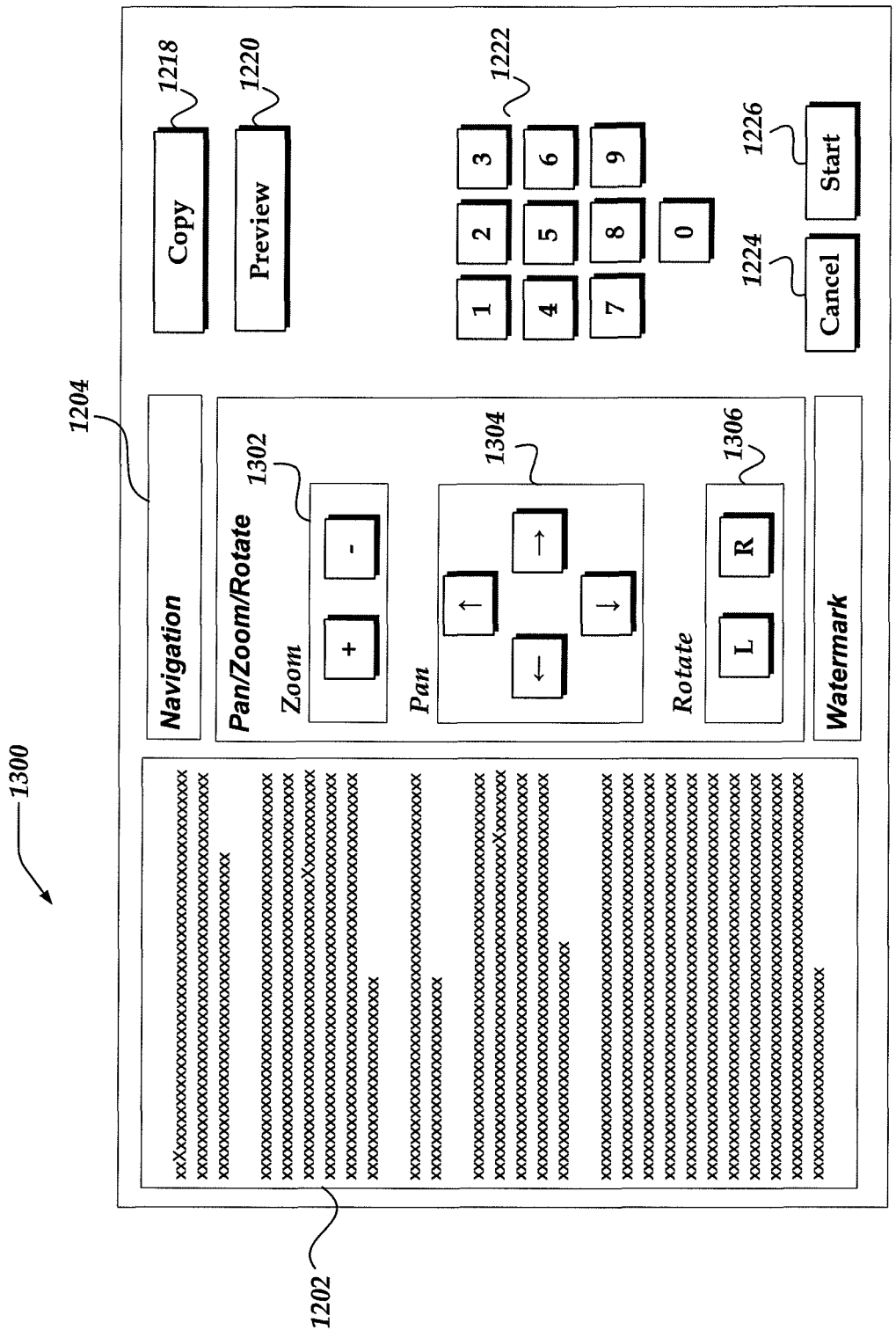
Figure 14:
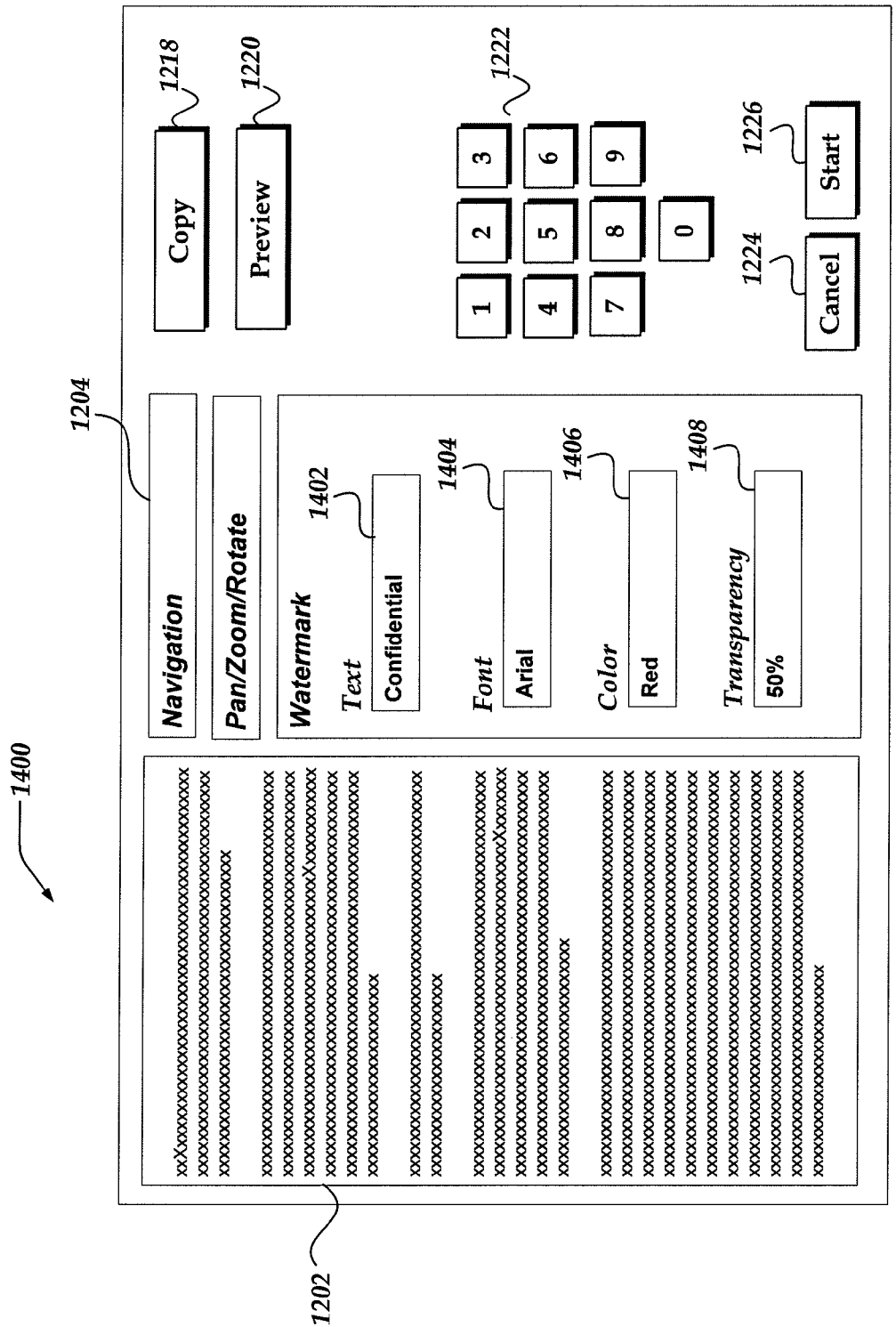

FIGS. 12-14 illustrate an exemplary user interface that may be implemented as part of various embodiments of the invention. For example, user interface 1200 of FIG. 12 may depict an implementation of print preview UI 224 executing on printer 200. User interface 1200 may include a display pane 1202 for displaying the document(s) to the user. In some embodiments, display pane 1202 may be a display that is included as part of a printing device, such as display 244 of printer 200. In some embodiments, display pane 1202 may be an LCD display, but the invention is not so limited and other types of displays may be supported without departing from the scope or spirit of the invention. Although FIG. 12 depicts display pane 1202 displaying text information in a document, the invention is not so limited and document(s) displayed in display pane 1202 may include text, images, graphics, or virtually any other type of data that may be printed at a printing device, or any combination of same. User interface 1200 may further include various controls to allow the user to manipulate, edit, view, and/or select document(s) to be displayed in display pane 1202. Controls may include virtually any type of user interface controls, including but not limited to buttons, radio buttons, text input fields, checkboxes, drop-down lists, lists, scroll bars, and the like.

In some embodiments, user interface 1200 may include various controls such as a Copy button 1218, to allow the user to make a Copy of document(s), and/or Preview button 1210 to allow the user to begin a session of previewing and editing document(s) from a print job received at the printing device. User interface 1200 may also include a keypad such as keypad 1222. Although keypad 1222 is a numeric keypad (including numbers), the invention is not so limited. Keypad 1222 may also be alphabetic and include letters as well as numbers, and may also include virtually any character in a character set (e.g. ASCII, Unicode, etc.). User interface may further include controls such as Cancel button 1224 and/or Start button 1226.

In some embodiments, user interface 1200 may include different tabs exposing different types of controls. For example, as shown in FIG. 12, tabs 1204 may include tabs for navigation controls, pan/zoom/rotate controls, and/or watermark controls. A user may select a tab to expose the controls of a particular type. FIG. 12 depicts a configuration of user interface 1200 in which a user has selected the Navigation tab to expose controls related to navigation. Such controls may include buttons for navigating between multiple document(s) in a particular print job, or between various pages of a particular document, for example Previous Page button 1206 and Next Page button 1208. Navigation tab may further include buttons to allow the user to select to print document(s) prior to or following edits. For example, Print button 1210 may allow the user to select to print the particular page being viewed and/or the particular document being displayed, and Print All button 1212 may allow the user to select to print all pages of the document being display, and/or all documents in the print job. The Navigation tab may also include a Grayscale control (e.g. select box) 1214 to allow the user to edit one or more pages of the document(s) to display and/or print in grayscale instead of color. In some embodiments, Navigation tab may also include a control to allow the user to select a particular output format in which to display the modified (or unmodified) document(s), for example, Print to TIFF control 1216 shown in FIG. 12.

FIG. 13 depicts a configuration of the user interface, user interface 1300, in which a user has selected the Pan/Zoom/Rotate tab to expose controls related to panning, zooming and/or rotating the document(s) in display pane 1202, or virtually any other type of action related to controlling the position, orientation and/or scale of the document(s). For example, Pan/Zoom/Rotate tab may include Zoom controls 1302 for zooming in or out in the display of document(s). Pan/Zoom/Rotate tab may further include Pan controls 1304 for panning up, down, left and/or right within one or more pages of document(s) displayed in display pane 1202. Pan/Zoom/Rotate tab may also include Rotate controls 1306 for rotating pages left (e.g. counterclockwise) and/or right (e.g. clockwise).

FIG. 14 depicts a configuration of the user interface, user interface 1400, in which a user has selected the Watermark tab to expose controls related to adding a watermark to one or more pages of document(s) in a print job. For example, Watermark tab may include a Text control 1402 to allow the user to select the text for a watermark. As shown in FIG. 14, the user has selected "Confidential" as the text for the watermark. In some embodiments, Text control 1402 may be a dropdown list allowing the user to select only from a set of predetermined options for the text. However, the invention is not so limited, and in some embodiments Text control 1402 may be a text entry box to allow the user to specify virtually any text imaginable for the watermark. Watermark tab may also include various controls to allow the user to select various formatting options for the watermark, including but not limited to a font for the watermark through Font control 1404, a color for the watermark through Color control 1406, and a transparency for the watermark through Transparency control 1408. Watermark tab may also include various controls not depicted, such as a control to determine the orientation of the watermark (e.g. whether the watermark is vertical, horizontal, at a 45% angle from the horizontal, etc.), font size, and other formatting options such as bold, italic, underline, and the like.

Although FIGS. 12-14 show examples of controls that are a particular type of control, the invention is not limited to the examples provided. For example, the controls depicted as buttons in FIGS. 12-14 may instead be implemented as text boxes, dropdown lists, radio buttons, or virtually any type of user interface control. Once the user has selected one or more edits through the controls of tabs 1204, the user may push the Preview button 1220 to command the print processing application to process the user's edits and generate modifications to the intermediate document(s), and/or generate a rasterized image of the modified document(s) as described further herein. On viewing the displayed modified document(s) and/or rasterized image of the modified document(s) in display pane 1202, the user may then choose to make further edits, unselect (e.g. back out) previously made edits, and so forth. Once the user is satisfied with the modified document(s), he/she may select Print button 1210 and/or Print button 1212 to print some or all pages from the modified document(s).

The above specification, examples, and data provide a complete description of the manufacture and use of the composition of the invention. Because many embodiments of the invention can be made without departing from the spirit and scope of the invention, the invention resides in the claims hereinafter appended.

What is claimed as new and desired to be protected by Letters Patent of the United States is:

1. A method for modifying printing of at least one document at a printer, comprising:
    receiving the at least one document for printing at the printer;
    receiving at the printer an indication of at least one user edit to add new content to at least one intermediate document generated from the at least one received document;
    generating at least one modification to the at least one intermediate document, based at least on the at least one user edit being applied to the at least one intermediate document at the printer;
    providing to a user, a print preview of the at least one intermediate document with the at least one modification; and
    enabling printing of the at least one intermediate document with the at least one modification at the printer.

2. The method of claim 1, further comprising:
    generating the at least one intermediate document from the at least one received document;
    caching the at least one intermediate document;
    displaying the at least one intermediate document in a print preview user interface; and
    enabling editing of the displayed at least one intermediate document by the user in the print preview user interface.

3. The method of claim 1, wherein the at least one user edit is for at least one of a letterhead, a watermark, a header, a footer, a page numbering, a N-up, a page scaling, and a pantone color.

4. The method of claim 1, wherein generating at least one modification to the at least one intermediate document further comprises:
    if the at least one user edit is to a content of the at least one intermediate document, generating at least one overlay for the at least one user edit and applying the at least one overlay to the at least one intermediate document; and
    if the at least one user edit is to a layout of the at least one intermediate document, generating at least one object modification for the at least one user edit and applying the at least one object modification to the at least one intermediate document.

5. The method of claim 1, wherein providing to the user the print preview of the at least one modification to the at least one intermediate document further comprises:
    displaying the at least one intermediate document including the at least one user edit to the user in a print preview user interface;
    enabling the user to specify at least one additional user edit to the at least one intermediate document; and
    applying the at least one additional user edit to the at least one intermediate document.

6. The method of claim 1, wherein enabling printing of the at least one intermediate document with the at least one modification further comprises:
    generating a raster image of the at least one intermediate document with the at least one modification for the printer; and
    providing the raster image to a print output driver for the printer.

7. The method of claim 1, wherein enabling printing of the at least one intermediate document with the at least one modification further comprises;
    generating a raster image of the at least one intermediate document with the at least one modification for the printer;
    displaying the raster image in a print preview user interface; and
    providing the raster image to a print output driver for the printer.

8. The method of claim 1, wherein the at least one received document is received in a page description language that is one of Postscript, PCL, PDF, and XPS.

9. A non-transitory processor readable storage medium storing instructions that enable a processor to perform actions for modifying printing of at least one document at a printer, comprising:
    receiving the at least one document for printing at the printer;
    receiving at the printer an indication of at least one user edit to add new content to at least one intermediate document generated from the at least one received document;
    generating at least one modification to the at least one intermediate document, based at least on the at least one user edit being applied to the at least one intermediate document at the printer;
    providing to a user a print preview of the at least one intermediate document with the at least one modification; and
    enabling printing of the at least one intermediate document with the at least one modification at the printer.

10. The non-transitory processor readable storage medium of claim 9, wherein the actions further comprise:
    generating the at least one intermediate document from the at least one received document;
    caching the at least one intermediate document;
    displaying the at least one intermediate document in a print preview user interface; and
    enabling editing of the displayed at least one intermediate document by the user in the print preview user interface.

11. The non-transitory processor readable storage medium of claim 9, wherein the actions farther comprise;
    providing a digital version of the at least one intermediate document with the at least one modification.

12. The non-transitory processor readable storage medium of claim 9, wherein generating at least one modification to the at least one intermediate document further comprises:
    if the at least one user edit is to a content of the at least one intermediate document, generating at least one overlay for the at least one user edit and applying the at least one overlay to the at least one intermediate document; and
    if the at least one user edit is to a layout of the at least one intermediate document, generating at least one object modification for the at least one user edit and applying the at least one object modification to the at least one intermediate document.

13. The non-transitory processor readable storage medium of claim 9, wherein providing to the user the print preview of the at least one modification to the at least one intermediate document further comprises:
    displaying the at least one intermediate document including the at least one user edit to the user in a print preview user interface;
    enabling the user to specify at least one additional user edit to the at least one intermediate document; and
    applying the at least one additional user edit to the at least one intermediate document.

14. An apparatus for modifying printing of at least one document, comprising:
   a network interface, in communication with a network;
   a processor, in communication with the network interface; and
   a processor readable storage medium in communication with the processor, storing instructions that enable the processor to perform actions for modifying the printing of the at least one document, including:
      receiving the at least one document for printing;
      receiving an indication of at least one user edit to add new content to at least one intermediate document generated from the at least one received document;
      generating at least one modification to the at least one intermediate document, based at least on the at least one user edit being applied to the at least one intermediate document at the apparatus;
      providing to a user a print preview of the at least one intermediate document with the at least one modification; and
      enabling printing of the at least one intermediate document with the at least one modification.

15. The apparatus of claim 14, wherein the actions further include:
   generating the at least one intermediate document from the received at least one received document;
   caching the at least one intermediate document;
   displaying the at least one intermediate document in a print preview user interface; and
   enabling editing of the displayed at least one intermediate document by the user in the print preview user interface.

16. The apparatus of claim 14 further comprising a display to present the print preview user interface to the user.

17. The apparatus of claim 14, wherein the actions further include:
   displaying the at least one intermediate document including the at least one user edit to the user in a print preview user interface;
   enabling the user to specify at least one additional user edit to the at least one intermediate document; and
   applying the at least one additional user edit to the at least one intermediate document.

18. The apparatus of claim 14, wherein the actions further include:
   generating a raster image of the at least one intermediate document with the at least one modification; and
   providing the raster image to a print output driver.

19. A system for modifying printing of at least one document at a printer device, comprising:
   a client device; and
   the printer device, in communication with the client device, including:
      a processor; and
      a processor readable storage medium storing instructions that enable the processor to perform actions, comprising:
         receiving from the client device the at least one document for printing at the printer device;
         receiving at the printer device an indication of at least one user edit to add content to at least one intermediate document generated from the at least one received document;
         generating at least one modification to the at least one intermediate document, based at least on the at least one user edit being applied to the at least one intermediate document at the printer device;
         providing to a user a print preview of the at least one intermediate document with the at least one modification; and
         enabling printing of the at least one intermediate document with the at least one modification at the printer device.

20. The system of claim 19, wherein the print preview is provided to the user at the client device.

* * * * *

UNITED STATES PATENT AND TRADEMARK OFFICE
CERTIFICATE OF CORRECTION

| | |
|---|---|
| PATENT NO. | : 8,553,260 B2 |
| APPLICATION NO. | : 12/791844 |
| DATED | : October 8, 2013 |
| INVENTOR(S) | : Mark Haines Goldwater et al. |

It is certified that error appears in the above-identified patent and that said Letters Patent is hereby corrected as shown below:

In the Specifications

1. In Column 8, Line 46, delete "system 200" and insert -- system 220 --, therefor.

2. In Column 12, Line 47, delete "(BIOS) 450" and insert -- (BIOS) 452 --, therefor.

3. In Column 18, Line 27, delete "and or" and insert -- and/or --, therefor.

4. In Column 25, Line 43, delete "Preview button 1210" and insert -- Preview button 1220 --, therefor.

5. In Column 26, Line 66, delete "Print button 1212" and insert -- Print All button 1212 --, therefor.

In the Claims

6. In Column 27, Line 21, in Claim 1, delete "to a user," and insert -- to a user --, therefor.

7. In Column 28, Line 3, in Claim 7, delete "comprises;" and insert -- comprises: --, therefor.

8. In Column 28, Line 42, in Claim 11, delete "farther comprise;" and insert -- further comprise: --, therefor.

9. In Column 29, Line 31, in Claim 16, delete "claim 14" and insert -- claim 14, --, therefor.

Signed and Sealed this
Twentieth Day of May, 2014

Michelle K. Lee
*Deputy Director of the United States Patent and Trademark Office*